US009475571B2

(12) United States Patent
Saito et al.

(10) Patent No.: US 9,475,571 B2
(45) Date of Patent: Oct. 25, 2016

(54) AIRCRAFT REACTION LINK AND MOVING SURFACE DRIVE UNIT

(71) Applicant: NABTESCO CORPORATION, Tokyo (JP)

(72) Inventors: Makoto Saito, Hyogo (JP); Kenji Abe, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 203 days.

(21) Appl. No.: 14/267,194

(22) Filed: May 1, 2014

(65) Prior Publication Data

US 2014/0332626 A1    Nov. 13, 2014

(30) Foreign Application Priority Data

May 7, 2013 (JP) .................................. 2013-97344
Mar. 20, 2014 (JP) .................................. 2014-57874

(51) Int. Cl.
*B64C 13/28* (2006.01)
*B64C 9/02* (2006.01)
*B64C 13/36* (2006.01)

(52) U.S. Cl.
CPC ................ *B64C 13/28* (2013.01); *B64C 9/02* (2013.01); *B64C 13/36* (2013.01); *Y02T 50/44* (2013.01)

(58) Field of Classification Search
CPC ...................................................... B64C 13/28
USPC ........................................................ 244/99.3
See application file for complete search history.

(56) References Cited

U.S. PATENT DOCUMENTS

| 7,500,641 | B2 * | 3/2009 | Sakurai | ..................... B64C 9/16 244/215 |
| 8,376,271 | B2 * | 2/2013 | Saito | ....................... B64C 13/24 244/213 |
| 8,757,544 | B2 * | 6/2014 | Ito | ........................... B64C 13/36 244/99.3 |
| 8,960,031 | B2 * | 2/2015 | Keech | ...................... B64C 5/02 244/99.3 |
| 2010/0270426 | A1 | 10/2010 | Saito et al. | |

(Continued)

FOREIGN PATENT DOCUMENTS

| EP | 2332830 A2 | 6/2011 |
| EP | 2368796 A2 | 9/2011 |
| JP | 2010-254167 A | 11/2010 |

OTHER PUBLICATIONS

The extended European search report issued by the European Patent Office on Jul. 30, 2014, which corresponds to EP14167155.2-1754 and is related to U.S. Appl. No. 14/267,194.

*Primary Examiner* — Brian M O'Hara
*Assistant Examiner* — Keith L Dixon
(74) *Attorney, Agent, or Firm* — Studebaker & Brackett PC

(57) ABSTRACT

An aircraft reaction link includes a head portion and a link body portion that is made of fiber reinforced plastic and formed integrally. The link body portion has a pair of leg portions, and a connecting portion that connects one end portion of each of the pair of leg portions to each other. The other end portion of each of the pair of leg portions is provided pivotably with respect to a second end side of the actuator. The head portion has a plurality of head constituent members that are fixed to the connecting portion in a state of being arranged so as to surround the outer periphery of the connecting portion, one of the head constituent members being provided with a bearing, and the head portion is provided pivotably with respect to the moving surface via the bearing.

15 Claims, 19 Drawing Sheets

(56) References Cited

U.S. PATENT DOCUMENTS

2011/0139938 A1* 6/2011 Itoh .................. B64C 13/24 244/226

2011/0220761 A1* 9/2011 Ogawa .................. B64C 13/24 244/99.3

* cited by examiner

AIRCRAFT REACTION LINK AND MOVING SURFACE DRIVE UNIT

CROSS-REFERENCE TO RELATED APPLICATION

This application claims priority to Japanese Patent Application No. 2013-97344 and No. 2014-57874. The entire disclosure of Japanese Patent Application No. 2013-97344 and No. 2014-57874 is hereby incorporated herein by reference.

BACKGROUND OF THE INVENTION

1. Field of the Invention

The present invention relates to an aircraft reaction link connected to an actuator whose one end side is pivotably attached to a moving surface of an aircraft or to a member attached to the moving surface, and a moving surface drive unit including the aircraft reaction link.

2. Description of the Related Art

An aircraft is equipped with moving surfaces that are formed as control surfaces and configured as main flight control surfaces such as an aileron, a rudder, and an elevator. An aircraft is also equipped with moving surfaces configured as secondary flight control surfaces such as a flap and a spoiler. Furthermore, an aircraft reaction link that is pivotably connected to each moving surface and a hydraulically-operated actuator attached to the moving surface or to a member attached to the moving surface is known as a constituent component of a moving surface drive unit for driving the moving surface.

Meanwhile, in recent years, more and more constituent components that have conventionally been made of metal are made of fiber reinforced plastic (FRP) for the purpose of a further reduction in weight of an aircraft. Regarding the aforementioned reaction link, reaction links made of carbon fiber reinforced plastic (CFRP), which is a kind of fiber reinforced plastic, are disclosed (e.g., JP2010-254167 A). For example, as disclosed in FIG. 1, such a reaction link has a substantially U-shaped portion constituted by a pair of linear portions, a connecting portion, and a pair of bent portions, and a projecting portion provided with a control surface-side bearing portion at an edge, and the substantially U-shaped portion and the projecting portion are formed integrally. The cross-section of this reaction link is formed as a hollow cross-section, in terms of ensuring of strength and a reduction in weight.

SUMMARY OF THE INVENTION

Incidentally, the aforementioned reaction link has a relatively complicated shape, resulting in a high manufacturing cost.

Moreover, a joint portion between the connecting portion and the projecting portion is a relatively complicated quadric surface, and it is therefore difficult to overlay carbon fibers on the joint portion in close contact with each other.

The present invention is for solving the foregoing problem, and an object thereof is to provide an aircraft reaction link whose weight can be reduced and whose strength can be ensured, and that can be easily manufactured.

(1) In order to achieve the above-stated object, an aircraft reaction link according to an aspect of the present invention is an aircraft reaction link connected to an actuator whose first end side is pivotably attached to a moving surface of an aircraft or to a member attached to the moving surface, the aircraft reaction link including: a link body portion that has a pair of leg portions extending linearly and arranged side by side and a connecting portion connecting one end portion of each of the leg portions to each other, the pair of leg portions and the connecting portion being made of fiber reinforced plastic and formed integrally, and the other end portion of each of the leg portions being provided pivotably with respect to the second end side of the actuator; and a head portion that has a plurality of head constituent members fixed to the connecting portion in a state of being arranged so as to surround the outer periphery of the connecting portion, and that is provided pivotably with respect to the moving surface, via a bearing provided in one of the head constituent members.

With this configuration, the link body portion having the pair of leg portions and the connecting portion is made of fiber reinforced plastic. Accordingly, the strength of the reaction link can be ensured, while the weight thereof can be reduced, as compared with the case where the link body portion is made of metal.

Furthermore, with this configuration, the head portion including the bearing is provided as a separate member from the link body portion. With this configuration, the configuration of each portion is simplified as compared with, for example, the case where the head portion is integrated with the link body portion, and accordingly the manufacturing cost can be reduced. Moreover, with this configuration, the head portion can be easily attached to the link body portion by fixing the head constituent members to the connecting portion while arranging the head constituent members so as to surround the outer periphery of the connecting portion.

Furthermore, with this configuration, a complicated quadric surface portion, such as one disclosed in aforementioned JP2010-254167 A, that is provided so as to smoothly connect the substantially U-shaped portion to the projecting portion in the case where an aircraft reaction link is integrally formed, is not formed. For this reason, the reinforced fibers can be easily arranged in the link body portion in close contact with each other.

Accordingly, with this configuration, it is possible to provide an aircraft reaction link whose weight can be reduced and whose strength can be ensured, and that can be easily manufactured.

(2) Preferably, the aircraft reaction link further includes a cord body that is wound around the head constituent members so as to surround the head constituent members, and thus presses the head constituent members toward the connecting portion side and fixes the head constituent members to the connecting portion.

With this configuration, the head constituent members are fixed to the connecting portion by the cord body, in a state of being pressed toward the connecting portion side and in closer contact with the connecting portion. Thus, the head portion can be more firmly fixed to the link body portion.

(3) Further preferably, the aircraft reaction link further includes a head fixing portion made of fiber reinforced plastic that contains reinforced fibers serving as the cord body and is provided so as to surround the head constituent members.

Thus, as a result of the head fixing portion being made of relatively lightweight and strong fiber reinforced plastic, the weight of the head fixing portion can be reduced, and the strength thereof can be ensured.

(4) Preferably, the head constituent members include a first head member and a second head member, and the first head member and the second head member each have a pressing portion that is pressed toward the other head member such that the pressing portions of the first and second head members sandwich and retain the connecting portion.

With this configuration, the number of parts constituting the head portion can be reduced. Moreover, the head portion can be easily fixed to the connecting portion by the pressing portions of the two head constituent members (the first head member and the second head member) sandwiching and fixing the connecting portion.

(5) Further preferably, the aircraft reaction link further includes a wedge member that is formed in a wedge shape whose thickness becomes thinner from a first end side toward a second end side, and that is driven between the connecting portion and the first head member or the second head member such that a first surface of the wedge member comes into contact with the first head member or the second head member, and such that a second surface of the wedge member that is opposite to the first surface comes into contact with the connecting portion.

With this configuration, in the head portion in a state where the cord body is wound therearound, the wedge member is driven between the head portion and the connecting portion. At this time, the tensile force on the cord body wound around the head portion can be easily adjusted by adjusting the amount of driving of the wedge member.

(6) Preferably, the wedge member is driven between the pressing portion and the connecting portion.

With this configuration, forces in directions in which the two head members move away from each other are applied to the two head members by the wedge member. Thus, a tensile force can be moderately applied to the cord body wound around the two head members.

(7) Preferably, the aircraft reaction link further includes: a pair of the wedge members that are driven in directions in which the wedge members approach each other, between the connecting portion and the first head member or the second head member; and a connecting member that connects the wedge members to each other.

With this configuration, since the pair of the wedge members are connected to each other, the wedge members can be prevented from becoming detached.

(8) Preferably, at least one of the first head member and the second head member has a wedge recess portion that forms a gap into which the wedge member is driven, between the wedge recess portion and the connecting portion, in a state where the head portion is fixed to the connecting portion.

With this configuration, the wedge member can be easily driven between the head member and the connecting portion.

(9) Further preferably, the wedge recess portion has a bottom portion having a flat surface that forms the gap into which the wedge member is driven, between the flat surface and the connecting portion, and the first surface of the wedge member or the second surface of the wedge member is in contact with the flat surface.

With this configuration, the flat surface comes into surface contact with the first surface of the wedge member or the second surface of the wedge member, in a state where the wedge member has been driven. Thus, since a contacting area between the wedge member and the head portion can be ensured, the risk of the wedge member becoming detached from the gap can be reduced.

(10) Preferably, the fiber reinforced plastic contained in the leg portions includes: a first material in which a direction of fibers contained therein is arranged so as to extend in an extending direction of the link body portion; and a second material in which directions of fibers contained therein are arranged so as to perpendicularly intersect each other and intersect the direction of the fibers contained in the first material.

When the reaction link is used, a stress in a direction mainly in the extending direction of the link body portion (the extending direction of the leg portions) is generated on the leg portions of the reaction link. Meanwhile, a reaction link that is hard to break can be configured by aligning, in the leg portions, the direction of the fibers mainly with the extending direction of the leg portions, as in this configuration.

Furthermore, a reaction link that is harder to break can be configured by using, in the leg portions, the second material in which the directions of the fibers contained therein perpendicularly intersect each other, as in this configuration.

(11) Further preferably, the connecting portion has: a linear portion that extends in a direction intersecting the pair of leg portions; and a pair of bent portions each connecting one of the pair of leg portions to one end portion of the linear portion and connecting the other of the pair of leg portions to the other end portion of the linear portion, and the bent portions each have the first material, the second material, and a third material in which a direction of fibers contained therein are arranged in a direction perpendicular to the direction of the fibers contained in the first material.

With this configuration, since the fibers extending in various directions are contained in the bent portions on which stresses in relatively various directions are generated, the strength and the rigidity of the bent portions can be increased.

(12) Preferably, the aircraft reaction link further includes: a bearing portion that is provided in the other end portion of each of the pair of leg portions, and that is fixed to the other end portion by a fastening member extending in a direction perpendicular to an extending direction of the leg portions, wherein the fastening member fixes the bearing portion to the other end portion, as a result of being inserted in both a first through hole formed in the other end portion and a second through hole formed in the bearing portion, and the aircraft reaction link further comprises a spacer that is inserted in a gap formed in the extending direction of the leg portions between the other end portion and the bearing portion.

With this configuration, a part of the bearing portion or a part of the leg portions can be firmly sandwiched and retained between the spacer and the fastening member. Accordingly, the leg portions and the bearing portion can be firmly fixed, as compared with the case where the leg portions and the bearing portion are fastened only by the fastening member.

(13) Further preferably, a projecting portion projecting from the other end portion of each of the pair of leg portions is formed in the other end portion, the bearing portion has a pair of support portions that sandwich and retain the projecting portion, and the fastening member is inserted in both the first through hole formed in the projecting portion and the second through hole formed in each of the pair of support portions.

With this configuration, the projecting portion and the pair of support portions are fastened to each other by the fastening member, in a state where the projecting portion is sandwiched by the pair of support portions. Thus, the bearing portion can be fixed to the leg portions.

(14) Preferably, the bearing portion has: a bearing retaining portion fixed to the other end portion of each of the pair of leg portions; and a bearing body pressed into a through hole formed in the bearing retaining portion.

With this configuration, a moderate compression stress can be generated on both the bearing body and the bearing retaining portion. Thus, the rigidity of these portions can be increased.

(15) In order to achieve the above-stated object, a moving surface drive unit according to an aspect of the present invention is A moving surface drive unit including: an actuator whose one end side is pivotably attached to a moving surface of an aircraft or to a member attached to the moving surface; and the aircraft reaction link according to any one of claims 1 to 14 that is connected to the actuator.

With this configuration, it is possible to provide a moving surface drive unit including an aircraft reaction link whose weight can be reduced and whose strength can be ensured, and that can be easily manufactured.

Note that the above and other objects, features, and advantages of the present invention will become apparent by reading the following description with the attached drawings.

DETAILED DESCRIPTION OF THE INVENTION

Hereinafter, modes for carrying out the present invention will be described with reference to the drawings.

Figure 1:
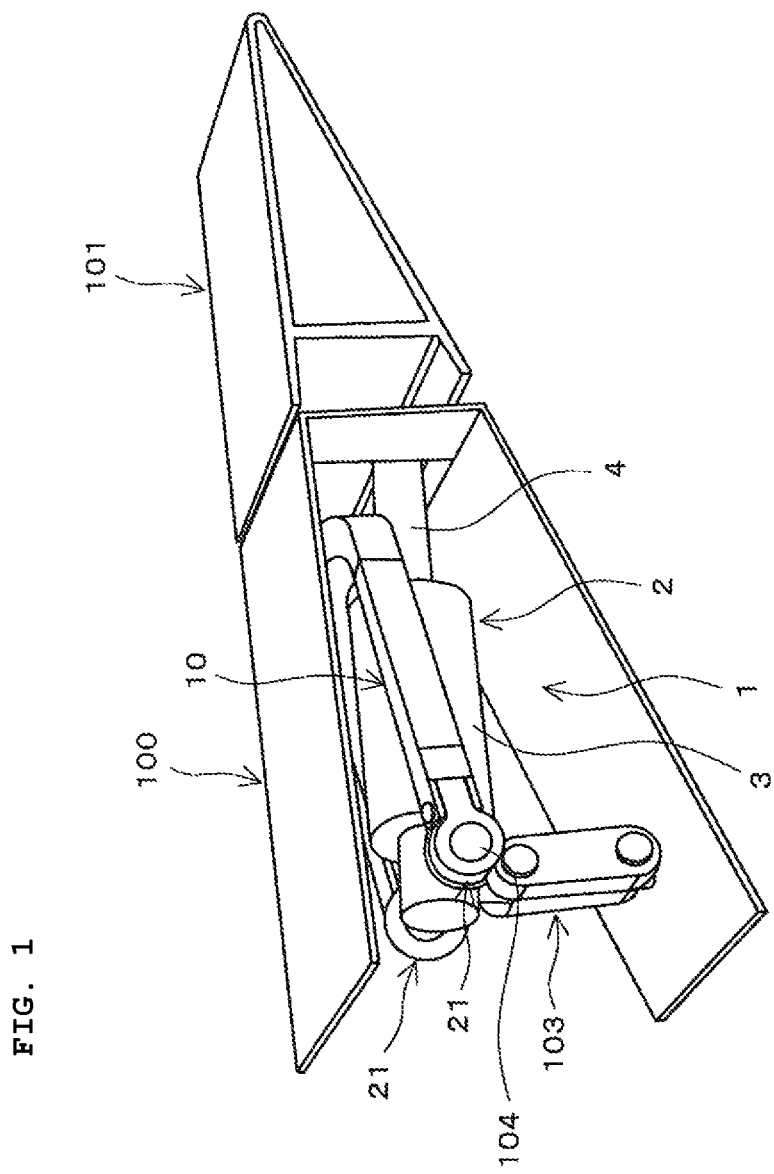
FIG. 1 is a perspective view schematically showing a state where a moving surface drive unit according to an embodiment of the present invention is attached to a wing and a moving surface of an aircraft.
Figure 2:
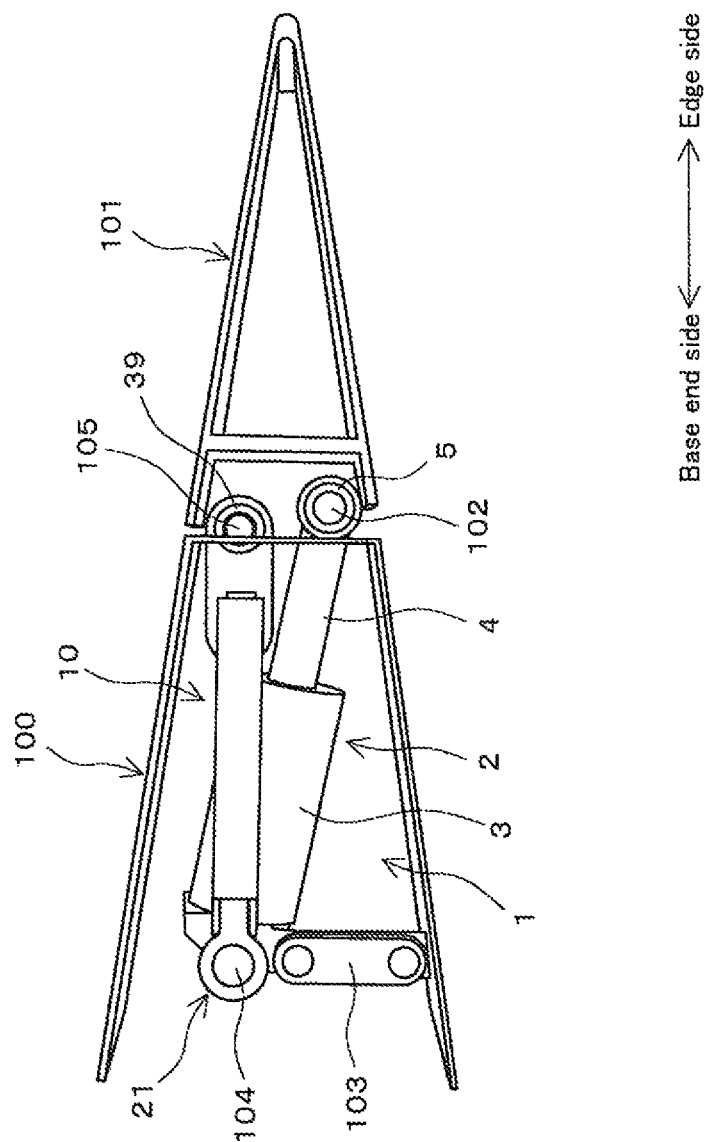
FIG. 2 is a side view of the moving surface drive unit in the state shown in FIG. 1.

FIGS. 1 and 2 are diagrams schematically showing a state where a moving surface drive unit 1 according to an embodiment of the present invention is attached to a wing 100 and a moving surface 101 of an aircraft, and are a perspective view and a side view, respectively. As shown in FIGS. 1 and 2, the moving surface drive unit 1 is installed in an aircraft whose wing 100 and moving surface 101 are shown solely and whose main part is omitted in the diagrams. The moving surface drive unit 1 is used for driving the moving surface 101 of the aircraft.

Note that a flight control surface of the aircraft constituting the moving surface 101 can be an aileron, a rudder, an elevator, or the like. The moving surface drive unit 1 may also be used as a device for driving a moving surface configured as a flap, a spoiler, or the like.

As shown in FIGS. 1 and 2, the moving surface drive unit 1 includes a linear actuator 2 and a reaction link 10. Note that, as denoted by arrows in the diagrams, the wing 100 side and the moving surface 101 side will be referred to as a base end side and an edge side, respectively, in a state where the moving surface drive unit 1 is attached to the aircraft.

The linear actuator 2 is provided as a hydraulically-operated linear actuator and includes a cylinder portion 3 and a rod portion 4. The linear actuator 2 is configured to operate such that the rod portion 4 linearly extends and contracts and is displaced with respect to the cylinder portion 3, as a result of pressure oil being supplied to and discharged from the inside of the cylinder portion 3. In the linear actuator 2, the edge side of the rod portion 4 on a first end side (the edge side in FIG. 2) of the linear actuator 2 is pivotably attached, via a bearing 5, to a pivot shaft 102 attached to the moving surface 101. Furthermore, in the linear actuators 2, an end of the cylinder portion 3 on a second end side (the base end side in FIG. 2) of the linear actuator 2 is pivotably attached to a support portion 103 attached to the wing 100.

Note that the edge side of the rod portion 4 does not need to be directly attached to the moving surface, and may be pivotably attached to a member attached to the moving surface. Furthermore, the linear actuator 2 is not limited to a hydraulically-operated linear actuator, and may alternatively be an electric linear actuator, for example. Examples of an electric linear actuator include an actuator provided with an electric motor, a ball screw, or the like.

The reaction link 10 is provided as a member for supporting, when output from the linear actuator 2 is given to the moving surface 101, a reaction force generated from the moving surface 101 due to this output. The reaction link 10 is provided in order that a load received by the moving surface 101 that is movable and pivots with respect to the wing 100 does not directly affect the wing 100 that is fixed and by which the moving surface 101 is pivotably supported.

An end of the reaction link 10 on a first end side (the edge side in FIG. 2) is attached to a fulcrum shaft 105 that rotatably supports the moving surface 101 with respect to the wing 100 side. Note that the end of the reaction link 10 on the first end side is rotatably attached to the fulcrum shaft 105 via a bearing 39, for example. Thus, the reaction link 10 is pivotably attached, on the first end side thereof, to the fulcrum shaft 105. Furthermore, the fulcrum shaft 105 and the pivot shaft 102 are provided such that the axial directions of the fulcrum shaft 105 and the pivot shaft 102 extend parallel with each other. The distance dimension between the fulcrum shaft 105 and the pivot shaft 102 is appropriately set so as to be able to ensure a torque arm length necessary for driving the moving surface 101 to pivot around the fulcrum shaft 105 as a result of operations of the linear actuator 2.

The reaction link 10 is formed so as to be branched into two portions from the first end side of the reaction link 10 attached to the fulcrum shaft 105 toward the second end side thereof (the base end side in FIG. 2) opposite to the first end side, for example. A part of the linear actuator 2 is arranged between the branched portions of the reaction link 10. An end of each branched portion of the reaction link 10 on the second end side is pivotably attached to the second end side of the linear actuator 2 that is opposite to a first end side thereof attached to the pivot shaft 102. Specifically, each end of the reaction link 10 on the base end side is rotatably attached to a connecting shaft 104 fixed to the cylinder portion 3, via a bearing (not shown).

Configuration of Reaction Link

Figure 3:
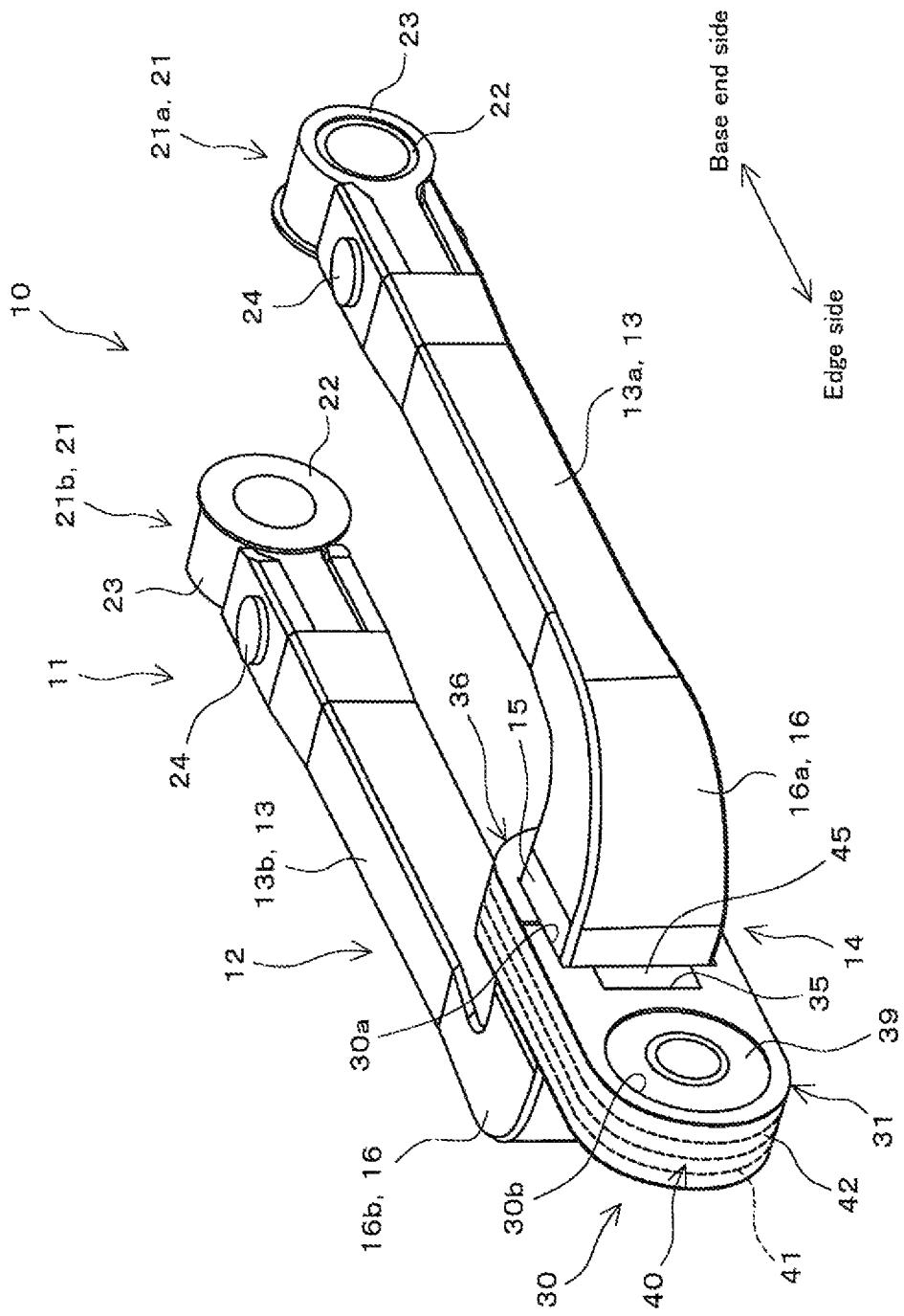
FIG. 3 is a perspective view of a reaction link of the moving surface drive unit according to an embodiment of the present invention.
Figure 4:
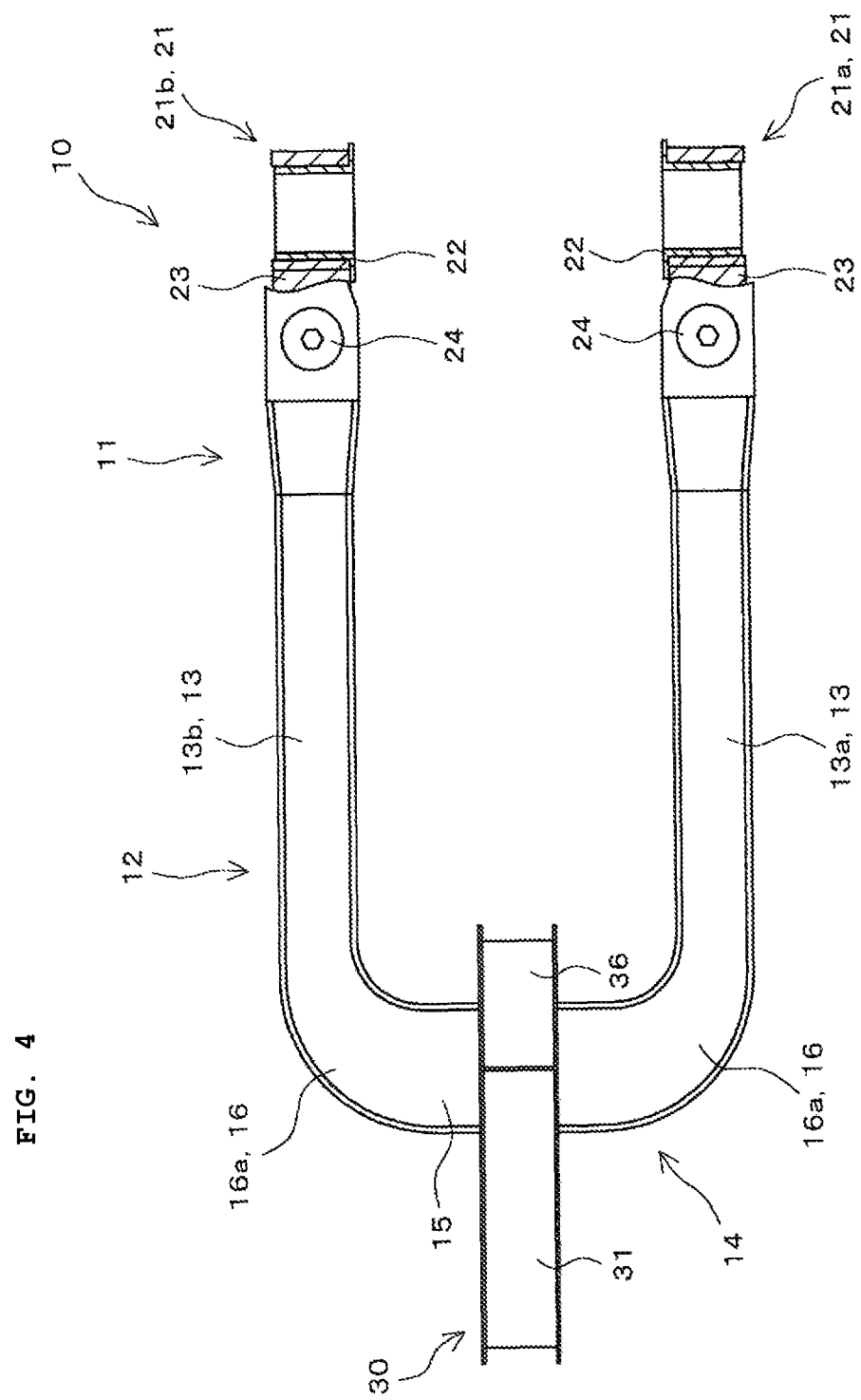
FIG. 4 is a partial cross-sectional view of the reaction link shown in FIG. 3, and is a plan view in which a part of the constituent components is omitted.
Figure 5:
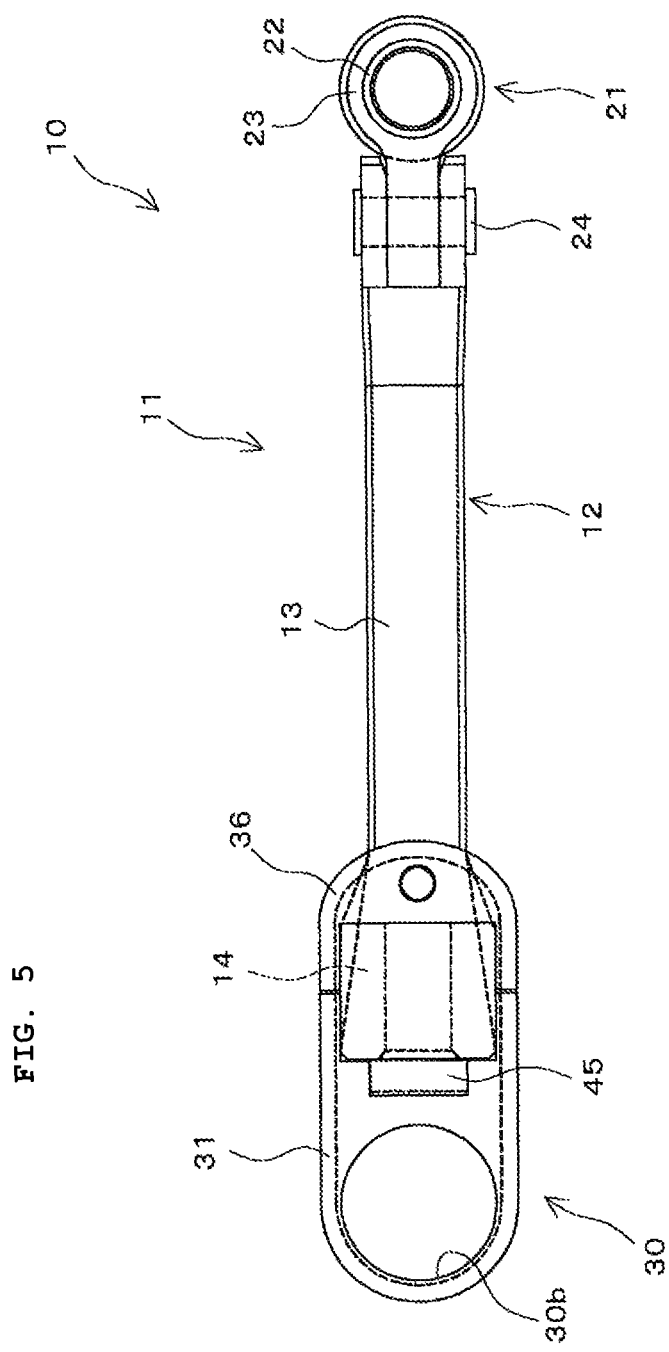
FIG. 5 is a side view of the reaction link shown in FIG. 3, and is a diagram in which a part of the constituent components is omitted.

FIGS. 3, 4, and 5 are diagrams for illustrating the shape of the reaction link 10, and are a perspective view, a plan view partially showing a cross-section, and a side view, respectively. Note that FIGS. 4 and 5 omit a part of the constituent components of the reaction link 10. The reaction link 10 includes a link portion 11 and a head portion 30.

The link portion 11 has a link body portion 12 formed substantially in a U-shape, and a pair of bearing portions 21.

The link body portion 12 has a pair of leg portions 13 and a connecting portion 14 connecting the pair of leg portions 13 to each other, and the leg portions 13 and the connecting portion 14 are integrally formed substantially in a U-shape. Although the link body portion 12 in the present embodiment is formed in a state (a so-called solid state) where the inside thereof is filled with a material constituting the link body portion 12, this need not be the case, and the link body portion 12 may alternatively be formed in a hollow state, for example.

The pair of leg portions 13 include two leg portions 13a, 13b, which are formed so as to extend linearly and are arranged parallel with each other with a space therebetween.

The connecting portion 14 has a linear portion 15 and a pair of bent portions 16. The linear portion 15 is arranged so as to extend between portions of the pair of leg portions 13 on a first end side (the edge side in FIG. 3) thereof. The pair of bent portions 16 are formed as a connecting portion between the linear portion 15 and the pair of leg portions 13, and include a bent portion 16a and a bent portion 16b. The bent portion 16a and the bent portion 16b are formed as portions that are bent substantially at a right angle, and the bent portion 16a and the bent portion 16b are formed so as to connect the linear portion 15 to the leg portion 13a and to connect the linear portion 15 to the leg portion 13b, respectively.

In the present embodiment, the link body portion 12 is made of carbon fiber reinforced plastic (CFRP). However, this need not be the case, and the link body portion 12 may alternatively be made of fiber reinforced plastic other than carbon fiber reinforced plastic. For example, the link body portion 12 may be made of fiber reinforced plastic such as glass fiber reinforced plastic (GFRP), glass-mat fiber reinforced plastic (GMT), boron fiber reinforced plastic (BFRP), aramid fiber reinforced plastic (AFRP, KFRP), polyethylene fiber reinforced plastic (DFRP), or Zylon reinforced plastic (ZFRP).

Carbon fibers in the link body portion 12 are arranged in an extending direction of the link body portion 12 formed in the U-shape (a direction extending from a base end portion of one of the leg portions of the link body portion 12 toward a base end portion of the other leg portion). Furthermore, carbon fibers in the bent portions 16 are arranged also in a direction intersecting the extending direction of the link body portion 12.

The pair of bearing portions 21 include two leg-side bearing portions 21a, 21b. The leg-side bearing portion 21a, which is one of the two leg-side bearing portions, is fixed on the base end side of the leg portion 13a, and the other leg-side bearing portion 21b is fixed to the base end side of the leg portion 13b. The pair of bearing portions 21 are rotatably attached to the connecting shaft 104 of the linear actuator 2 (see FIGS. 1 and 2). The leg-side bearing portions 21a, 21b each has a bearing body 22 formed in an annular shape, and a bearing retaining portion 23 that retains the bearing body 22. The leg-side bearing portions 21a, 21b are fixed to the leg portions 13a, 13b, respectively, by fastening members 24. In the present embodiment, the bearing body 22 is press-fit to the inner-circumferential surface of the bearing retaining portion 23. Thus, a moderate compression stress is generated on both the bearing body 22 and the bearing retaining portion 23, and therefore the rigidity in this portion can be increased.

In the present embodiment, both the bearing body 22 and the bearing retaining portion 23 are made of a metallic material. However, this need not be the case, and the bearing retaining portion 23 may be made of fiber reinforced plastic such as carbon fiber reinforced plastic.

Figure 6:
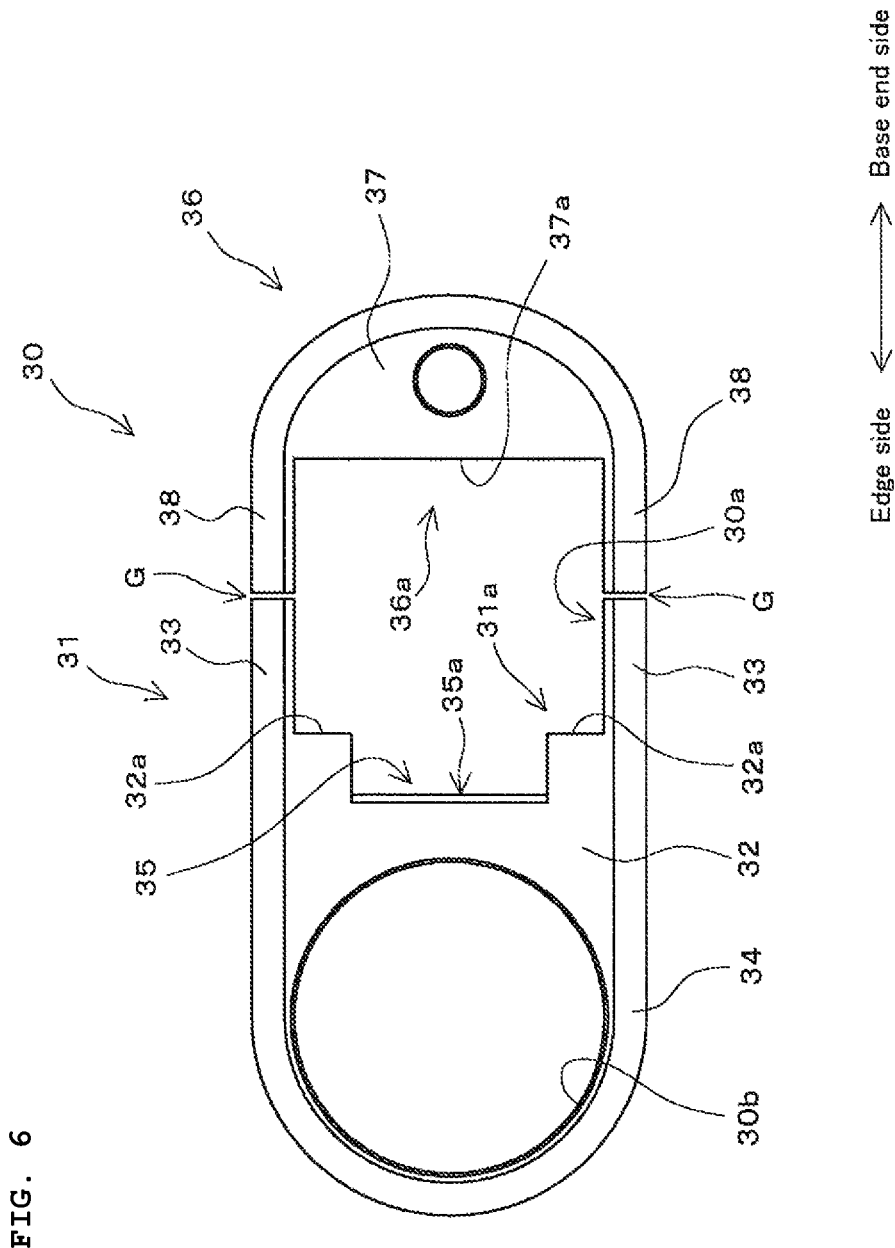
FIG. 6 is a plan view of a head portion according to an embodiment of the present invention.

FIG. 6 is a plan view of the head portion 30 according to the present embodiment. As shown in FIGS. 3 to 6 etc., the head portion 30 is formed substantially in a block shape having a predetermined thickness and is slightly elongated in one direction, and both ends of the head portion 30 in the longitudinal direction are formed in an arc shape when seen in a plan view. The head portion 30 has a rectangular through hole 30a passing through the head portion 30 in the thickness direction thereof, in a portion on one side (the base end side) in the longitudinal direction thereof. The head portion 30 is arranged such that the longitudinal direction thereof coincides with the longitudinal direction of the pair of leg portions 13, and is fixed to the linear portion 15 in a state where the linear portion 15 is inserted in the through hole 30a.

On the other hand, the head portion 30 has a circular through hole passing through the head portion 30 in the thickness direction thereof, in a portion on the second end side (the edge side in FIG. 3) in the longitudinal direction thereof. This through hole is provided as a bearing hole portion 30b, and a head-side bearing 39 is attached to the bearing hole portion 30b.

The head portion 30 is formed by combining two members that can be separated so as to divide the head portion 30 by a plane perpendicular to the longitudinal direction of the head portion 30. These two members are constituted by a first head member 31 and a second head member 36, as shown in FIGS. 3 and 6, etc. The first head member 31 is formed so as to be longer than the second head member 36 in the longitudinal direction of the head portion 30. The bearing hole portion 30b and a part of the through hole 30a are formed in the first head member 31. A part of the through hole 30a is formed in the second head member 36.

Figure 7A:
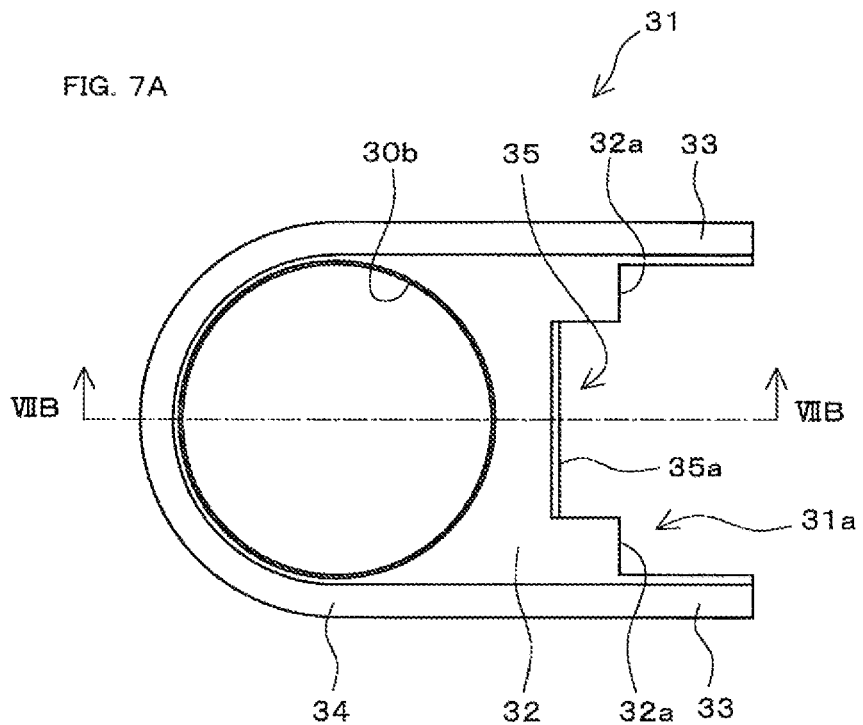
FIG. 7A is a diagram for illustrating the shape of a first head member, and is a plan view of the first head member.
Figure 7B:
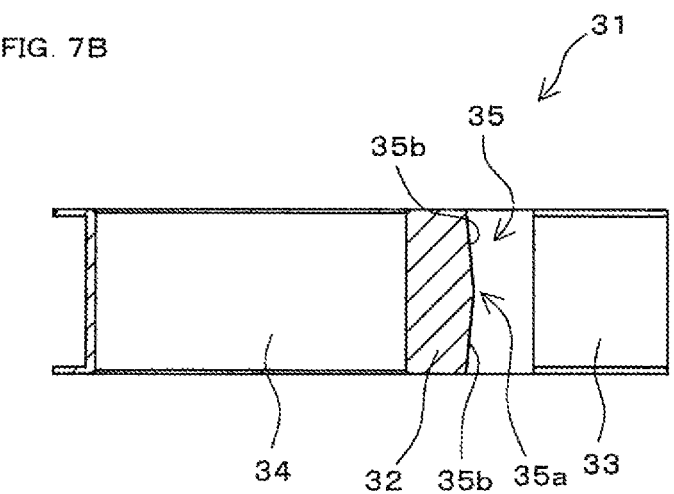
FIG. 7B is a diagram for illustrating the shape of the first head member, and is a cross-sectional view taken along line VIIB-VIIB in FIG. 7A.

FIG. 7A is a diagram for illustrating the shape of the first head member 31, and is a plan view of the first head member 31. FIG. 7B is a diagram for illustrating the shape of the first head member 31, and is a cross-sectional view taken along line VIIB-VIIB in FIG. 7A. The first head member 31 has a base portion 32, a pair of first head member-side leg portions 33 and 33, and an annular portion 34, which are configured integrally. Although the first head member 31 is made of a metallic material in the present embodiment, this need not be the case, and the first head member 31 may alternatively be made of fiber reinforced plastic such as carbon fiber reinforced plastic.

The base portion 32 is provided as a center portion of the first head member 31 in the longitudinal direction thereof. The base portion 32 has a pressing surface 32a (pressing portion) provided so as to face the linear portion 15 of the link body portion 12. The pair of first head member-side leg portions 33 and 33 are formed linearly so as to extend parallel with each other from both ends of the base portion 32 in the width direction thereof. The pair of first head member-side leg portions 33 and 33 are formed so as to extend up to an intermediate part of the linear portion 15, and are arranged with a space therebetween such that the linear portion 15 is sandwiched and retained therebetween. The pressing surface 32a and inner wall surfaces of the pair of first head member-side leg portions 33 and 33 constitute a part of an inner wall surface of the through hole 30a.

The annular portion 34 is provided as a portion having a substantially annular shape formed in a part of the base portion 32 on a side opposite to the first head member-side leg portions 33. The through hole formed in the annular portion 34 is provided as the aforementioned bearing hole portion 30b.

The first head member 31 also has a first head member-side fitting portion 31a. The first head member-side fitting portion 31a is constituted by inner portions of the pair of first head member-side leg portions 33 and 33 and a portion of the base portion 32 on the pressing surface 32a side. The first head member-side fitting portion 31a is formed so as to be fitted to a portion of the outer-circumferential surface of the linear portion 15 on a side (the edge side in FIG. 3) opposite to the pair of leg portions 13 side.

Furthermore, a wedge recess portion 35 is formed in the first head member 31. The wedge recess portion 35 is a portion formed as a recess in which wedge members 45, which will be described later in detail, are inserted. The wedge recess portion 35 is formed so as to extend in the thickness direction of the first head member 31, and to be recessed from the pressing surface 32a of the base portion 32 of the first head member 31 toward the annular portion 34. Thus, the wedge recess portion 35 is formed in a groove shape whose portion on the pressing surface 32a side is open and that has a bottom portion 35a extending in the thickness direction of the first head member 31.

The bottom portion 35a of the wedge recess portion 35 has two tapered surfaces 35b, 35b formed so as to extend from both surfaces of the first head member 31 in the thickness direction toward the center portion of the bottom portion 35a in the thickness direction as viewed cross-sectionally, as shown in FIG. 7B. The tapered surfaces 35b, 35b are formed so as to be slightly inclined from both surfaces of the first head member 31 in the thickness direction toward the pair of first head member-side leg portions 33. The tapered surfaces 35b are each constituted by a flat surface.

Figure 8A:
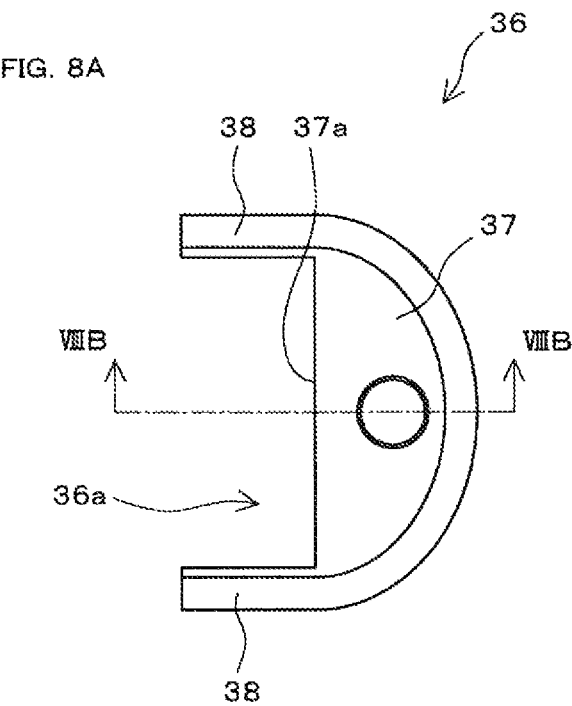
FIG. 8A is a diagram for illustrating the shape of a second head member, and is a plan view of the second head member.
Figure 8B:
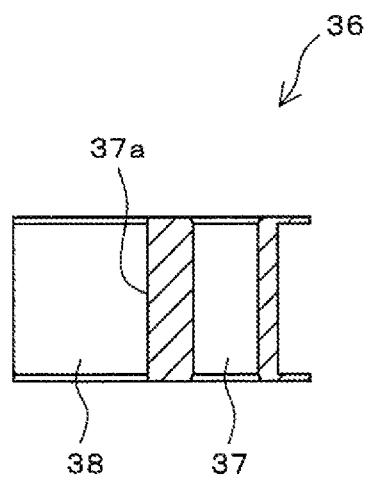
FIG. 8B is a diagram for illustrating the shape of the second head member, and is a cross-sectional view taken along line VIIIB-VIIIB in FIG. 8A.

FIG. 8A is a diagram for illustrating the shape of the second head member 36, and is a plan view of the second head member 36. FIG. 8B is a diagram for illustrating the shape of the second head member 36, and is a cross-sectional view taken along line VIIIB-VIIIB in FIG. 8A. The second head member 36 has a base portion 37 and a pair of second head member-side leg portions 38 and 38, which are configured integrally. Although the second head member 36 is made of a metallic material in the present embodiment, this need not be the case, and the second head member 36 may alternatively be made of fiber reinforced plastic such as carbon fiber reinforced plastic.

The base portion 37 is provided as a portion having a pressing surface 37a (pressing portion) provided so as to face the linear portion 15 of the link body portion 12. The pair of second head member-side leg portions 38 and 38 are formed linearly so as to extend parallel with each other from both ends of the base portion 37 in the width direction thereof. The pair of second head member-side leg portions 38 and 38 are formed so as to extend up to an intermediate part of the linear portion 15, and are arranged with a space therebetween such that the linear portion 15 is sandwiched and retained therebetween. The pressing surface 37a and inner wall surfaces of the pair of second head member-side leg portions 38 and 38 constitute a part of an inner wall surface of the through hole 30a.

The second head member 36 also has a second head member-side fitting portion 36a. The second head member-side fitting portion 36a is constituted by inner portions of the pair of second head member-side leg portions 38 and 38 and a portion of the base portion 37 on the pressing surface 37a side. The second head member-side fitting portion 36a is formed so as to be fitted to a portion of the outer-circumferential surface of the linear portion 15 on the pair of leg portions 13 side (the base end side in FIG. 3).

The first head member 31 and the second head member 36 of the head portion 30 are fixed to the linear portion 15 by a head fixing portion 40, which will be described later in detail, in a state of sandwiching the linear portion 15 of the link body portion 12. At this time, the head members 31 and 36 are fixed to the linear portion 15 in a state where a small gap G is formed between the leg portions 33 and 38 of the head members 31 and 36.

The head fixing portion 40 is made of carbon fiber reinforced plastic containing carbon fibers 41. As shown in FIG. 3, the head fixing portion 40 is formed in a ring shape covering the outer-circumferential surface of the head portion 30, and has plastic 42 serving as a base material and the carbon fibers 41 (cord body). In the head fixing portion 40, the carbon fibers 41 are arranged within the plastic 42 in a circumferential direction of the head portion 30. Note that the head fixing portion 40 is omitted in FIGS. 4 and 5.

Figure 9A:
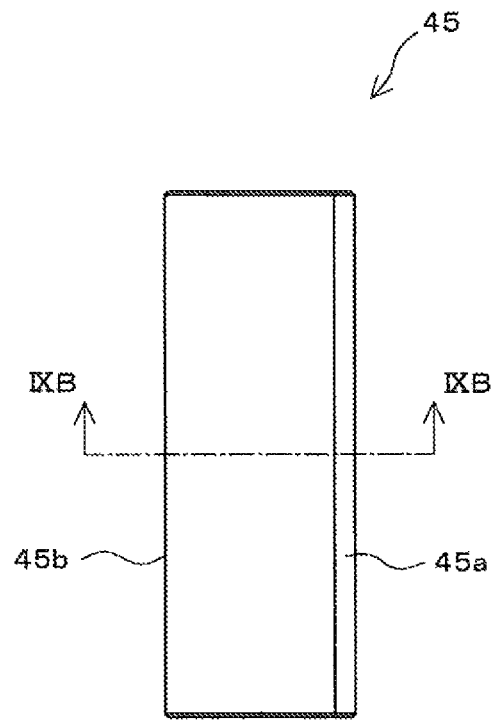
FIG. 9A is a diagram for illustrating the shape of a wedge member, and is a plan view of the wedge member.
Figure 9B:
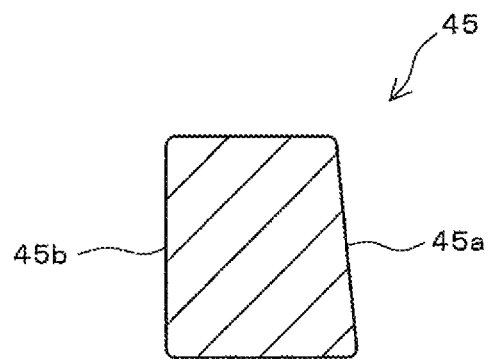
FIG. 9B is a diagram for illustrating the shape of the wedge member, and is a cross-sectional view taken along line IXB-IXB in FIG. 9A.

FIG. 9A is a diagram for illustrating the shape of each wedge member 45, and is a plan view of each wedge member 45. FIG. 9B is a diagram for illustrating the shape of each wedge member 45, and is a cross-sectional view taken along line IXB-IXB in FIG. 9A. The reaction link 10 includes two wedge members 45. Each wedge member 45 is a member formed substantially in a plate shape, and is arranged within the wedge recess portion 35 of the first head member 31 (see FIG. 3).

As shown in FIG. 9B, the wedge member 45 is formed such that the thickness thereof becomes thinner from a first end side toward a second end side. Front and back surfaces of the wedge member 45 in the thickness direction are both constituted by a flat surface. One of the front and back surfaces of each wedge member 45 (e.g., a first surface 45a) is in surface contact with one of the tapered surfaces 35b of the wedge recess portion 35, and the other of the front and back surfaces (e.g., a second surface 45b) is in surface contact with the linear portion 15.

Manufacturing Process of Reaction Link

Figure 10:
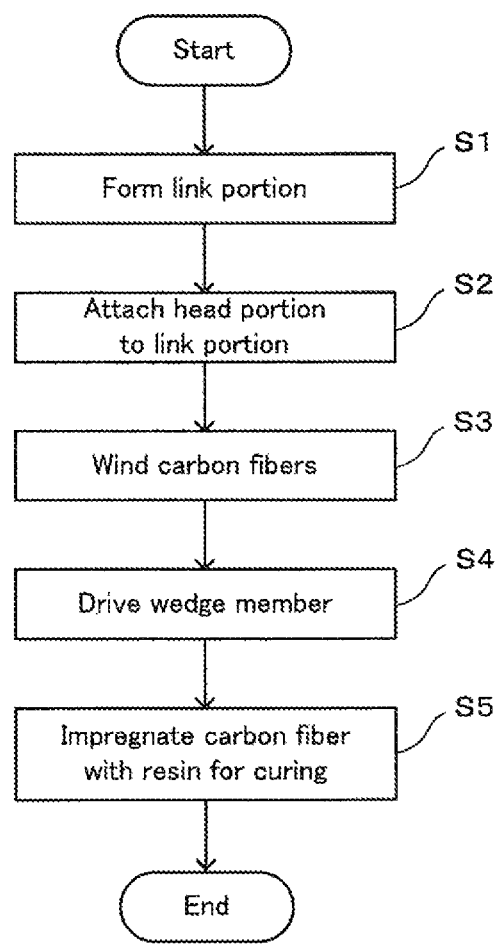
FIG. 10 is a flowchart for illustrating a manufacturing process of the reaction link.

FIG. 10 is a flowchart showing a manufacturing process of the reaction link 10. The manufacturing process of the reaction link 10 will now be described with reference to FIG. 10.

Initially, in step S1, the link portion 11 is formed. Specifically, in step S1, the link body portion 12 made of carbon fiber reinforced plastic is formed by means of resin molding. The bearing portions 21 are fastened to the link body portion 12 by the fastening members 24. In the link body portion 12, the fiber direction in the carbon fiber reinforced plastic is arranged in the extending direction of the link body portion 12 formed in a U-shape. Furthermore, in the bent portions 16, carbon fibers are arranged also in a direction intersecting the extending direction of the link body portion 12.

Next, in step S2, the head portion 30 is attached to the link portion 11. Specifically, in step S2, the fitting portions 31a and 36a of the first head member 31 and the second head member 36 are fitted to the linear portion 15 of the link portion 11.

Next, in step S3, the carbon fibers 41 are wound around the outer-circumferential surface of the head portion 30. Thus, the carbon fibers 41 are arranged in the longitudinal direction of the head portion 30 and, at both ends of the head portion 30, the carbon fibers 41 are arranged in the circumferential direction.

Figure 11:
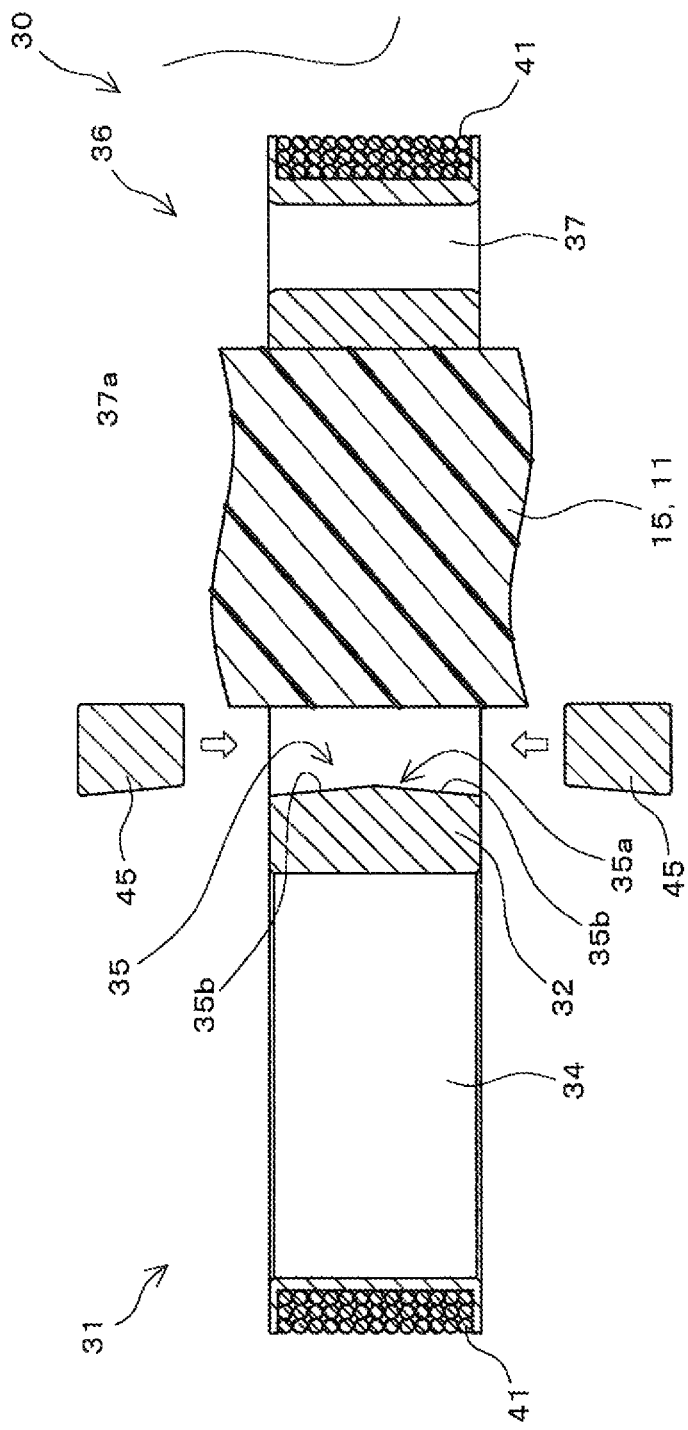
FIG. 11 is a cross-sectional view of the head portion in a state of being fitted to a linear portion, and the wedge member to be driven between the linear portion and the head portion in this state.

Next, in step S4, the wedge members 45 are driven between the head portion 30 and the linear portion 15, or specifically, into the wedge recess portion 35 of the first head member 31. FIG. 11 is a cross-sectional view showing the head portion 30 in a state of being fitted to the linear portion 15, and the wedge members 45 to be driven between the linear portion 15 and the head portion 30.

When the wedge members 45 are driven as mentioned above, the amount of driving of the wedge members 45 is adjusted such that a moderate tensile force is applied to the carbon fibers 41. Specifically, in an example, the amount of driving of the wedge members 45 is adjusted such that a tensile force that does not break the carbon fibers 41 under an environmental condition (e.g., from −50° C. to 50° C.) where the reaction link 10 is possibly used is applied to the carbon fibers 41. Thus, the head portion 30 can be firmly fixed to the link portion 11 while reducing the risk of a rupture of the carbon fibers 41.

Lastly, in step S5, the carbon fibers 41 are impregnated with resin serving as a base material, the resin is cured, and the head fixing portion 40 is thereby formed.

Operations of Moving Surface Drive Unit

Next, operations of the above-described moving surface drive unit 1 will be described. When the moving surface is driven, a hydraulic system operates based on an instruction from a controller (not shown), and pressure oil is supplied to and discharged from the cylinder portion 3 of the linear actuator 2. With this supply and discharge of the pressure oil, the rod portion 4 is displaced so as to project and retract with respect to the cylinder portion 3. Thus, the moving surface is driven on one end side of the rod portion 4 of the linear actuator 2, the rod portion 4 being pivotably supported by the support portion 103 fixed to the wing 100. At this time, as mentioned above, since the first end side and the second end side of the reaction link 10 are pivotably attached to the fulcrum shaft 105 of the moving surface and the connecting shaft 104 fixed to the cylinder portion 3, respectively, the moving surface is driven so as to pivot around the fulcrum shaft 105.

In the reaction link 10 in the moving surface drive unit 1 that operates as described above, a compression stress and a tensile stress mainly in the longitudinal direction of the pair of leg portions 13 and the head portion 30 are generated on the leg portions 13 and the head portion 30. Meanwhile, the carbon fibers are arranged in the pair of leg portions 13 in the longitudinal direction of the pair of leg portions 13. Furthermore, the carbon fibers are arranged in the head portion 30 in the longitudinal direction thereof. For this reason, the strength against the aforementioned compression stress and tensile stress generated on the pair of leg portions 13 and the head portion 30 can be ensured.

Furthermore, in the reaction link 10 in the moving surface drive unit 1 that operates as described above, a bending stress is generated on the linear portion 15 mainly in a direction intersecting the extending direction of the linear portion 15. Meanwhile, the carbon fibers are arranged in the linear portion 15 in the extending direction thereof. For this reason, the strength against the aforementioned bending stress generated on the linear portion 15 can be ensured.

Furthermore, in the reaction link 10 of the moving surface drive unit 1 that operates as described above, not only a stress generated in an extending direction of the bent portions 16a and 16b but also bending stresses in other directions and the like are generated as main stresses on the pair of bent portions 16. Meanwhile, the carbon fibers are arranged in the pair of bent portions 16 in the extending direction of the bent portions 16a and 16b, and are also arranged in a direction intersecting the extending direction of the bent portions 16a and 16b. Thus, the strength against stresses in various directions generated on the pair of bent portions 16 can be ensured.

Effects

As described above, in the reaction link 10 according to the present embodiment, the link body portion 12 having the pair of leg portions 13 and the connecting portion 14 are made of fiber reinforced plastic. Accordingly, the strength of the reaction link 10 can be ensured, while the weight thereof can be reduced, as compared with the case where the link body portion 12 is made of metal.

In the reaction link 10, the head portion 30 including the head-side bearing 39 is provided as a separate member from the link body portion 12. With this configuration, the configuration of each portion is simplified and accordingly the manufacturing cost can be reduced, as compared with, for example, the case where the head portion is formed integrally with the link body portion. Moreover, in the reaction link 10, the first head member 31 and the second head member 36, which are a plurality of head constituent members, are arranged so as to surround the outer periphery of the linear portion 15 and are fixed to the linear portion 15, and the head portion 30 can thereby be easily attached to the link body portion 12. In the reaction link 10, a complicated quadric surface portion provided in the case where an aircraft reaction link is integrally formed, such as one disclosed in aforementioned JP2010-254167 A, is not formed. For this reason, the carbon fibers can be easily arranged in the link body portion 12 in a close contact therewith.

Accordingly, it is possible to provide the reaction link 10 whose weight can be reduced and whose strength can be ensured, and that can be easily manufactured.

In the reaction link 10, the first head member 31 and the second head member 36, which are the plurality of head constituent members, are fixed to the linear portion 15 in a state of being pressed toward the linear portion 15 side and in a closer contact with the linear portion 15, due to the carbon fibers 41. Thus, the head portion 30 can be more firmly fixed to the link body portion 12.

In the reaction link 10, since the head fixing portion 40 is made of relatively lightweight and strong fiber reinforced plastic, the weight of the head fixing portion 40 can be reduced, and the strength thereof can be ensured.

In the reaction link 10, the carbon fibers are arranged in directions in which stresses are mainly generated on the reaction link 10. Specifically, the carbon fibers are arranged in the longitudinal direction of the pair of leg portions 13 and in the longitudinal direction of the head portion 30. In addition, the carbon fibers are arranged in the extending direction of the linear portion 15. Moreover, in the pair of bent portions 16, the carbon fibers are arranged not only in the extending direction of the bent portions 16 but also in the direction intersecting the extending direction of the bent portions 16. Thus, the carbon fibers can be efficiently arranged with respect to internal stresses generated on the reaction link 10. Accordingly, since the amount of carbon fibers for ensuring the strength necessary for the reaction link 10 can be reduced, the strength of the reaction link 10 can be efficiently ensured.

In the reaction link 10, a plurality of head members are constituted by two members (the first head member 31 and the second head member 36), the number of members constituting the head portion can be reduced. Furthermore, the head portion 30 can be easily fixed to the linear portion 15 as a result of the first head member 31 and the second head member 36 sandwiching and fixing the linear portion 15.

In general, when a cord-like member is wound around another member, it is difficult to adjust the tensile force on the cord-like member in a state of being wound around the other member, by winding the cord-like member around the other member while adjusting the tensile force on the cable member. That is to say, it is difficult in the present embodiment to wind the carbon fibers 41 around the linear portion 15 while adjusting the tensile force on the carbon fibers 41 such that the tensile force on the carbon fibers 41 in a state of being wound around the linear portion 15 is a desired tensile force.

Meanwhile, in the reaction link 10, the wedge members 45 are driven between the linear portion 15 and the head portion 30, which is in a state where the carbon fibers 41 are wound therearound and the head portion 30 is fixed to the linear portion 15. At this time, the tensile force on the carbon fibers 41 wound around the head portion 30 can be easily adjusted by adjusting the amount of driving of the wedge members 45. Furthermore, as a result of the amount of driving of the wedge members 45 being adjusted such that, for example, a tensile force that does not break the carbon fibers 41 under an environmental condition under which the reaction link 10 is possibly used is applied to the carbon fibers 41, the risk of a rupture of the carbon fibers 41 can be reduced, while the head portion 30 can be firmly fixed to the link portion 11. Furthermore, as a result of applying a moderate tensile force to the carbon fibers 41 as described above, when the reaction link 10 operates, a gap forming between the head portion 30 and the carbon fibers 41 or the carbon fibers 41 loosening and moving away from the head portion 30 can be prevented. Accordingly, the head portion 30 can be prevented from shifting with respect to the link portion 11.

In the reaction link 10, forces in directions in which the two head members 31 and 36 move away from each other are applied to the two head members 31 and 36 by the wedge members 45. Thus, a tensile force can be moderately applied to the carbon fibers 41 wound around the two head members 31 and 36.

In the reaction link 10, the wedge recess portion 35 is formed that forms the gap into which the wedge members 45 are driven, between the wedge recess portion 35 and the linear portion 15. Thus, the wedge members can be easily driven between the first head member 31 and the linear portion 15.

In the reaction link 10, a surface of each wedge member 45 on one side comes into surface contact with the tapered surface 35b of the first head member 31, in a state where the wedge members 45 have been driven. Thus, since a contacting area between the wedge members 45 and the head portion 30 can be ensured, the risk of the wedge member 45 becoming detached from the gap can be reduced.

With the moving surface drive unit 1 according to the present embodiment, it is possible to provide the moving surface drive unit 1 including the reaction link 10 whose weight can be reduced and whose strength can be ensured, and that can be easily manufactured.

Although an embodiment of the present invention has been described above, the present invention is not limited to the above embodiment, and various modifications may be implemented within the scope recited in the claims. For example, the following modifications may be implemented.

(1) Although the cord body wound around the head portion 30 is constituted by the carbon fibers 41 in the above embodiment, this need not be the case, and any kind of cord-like member may be used. For example, the cord body may be metallic or resin wires.

(2) Although the two head members 31 and 36 are fixed by the head fixing portion 40 that surrounds the outer-circumferential surface of the head portion 30 in the above embodiment, a configuration in which the head fixing portion 40 having such a shape is omitted may alternatively be employed. For example, the head members 31 and 36 may be fixed to each other by means of adhesive, brazing, or the like.

(3) Although the head portion 30 is constituted by the two head members 31 and 36 in the above embodiment, this need not be the case, and the head portion may be constituted by three or more head constituent members.

(4) Although the wedge members 45 are provided in the reaction link 10 in order to adjust the tensile force on the carbon fibers 41 in the above embodiment, this need not be the case, and a configuration in which the wedge members 45 are omitted may alternatively be employed. In this case, since the wedge recess portion of the first head member can be omitted, the shape of the first head member can be simplified.

(5) Although the wedge recess portion 35 is formed in the first head member 31 in the above embodiment, this need not be the case, and the wedge recess portion 35 may alternatively be formed in the second head member 36.

Figure 12:
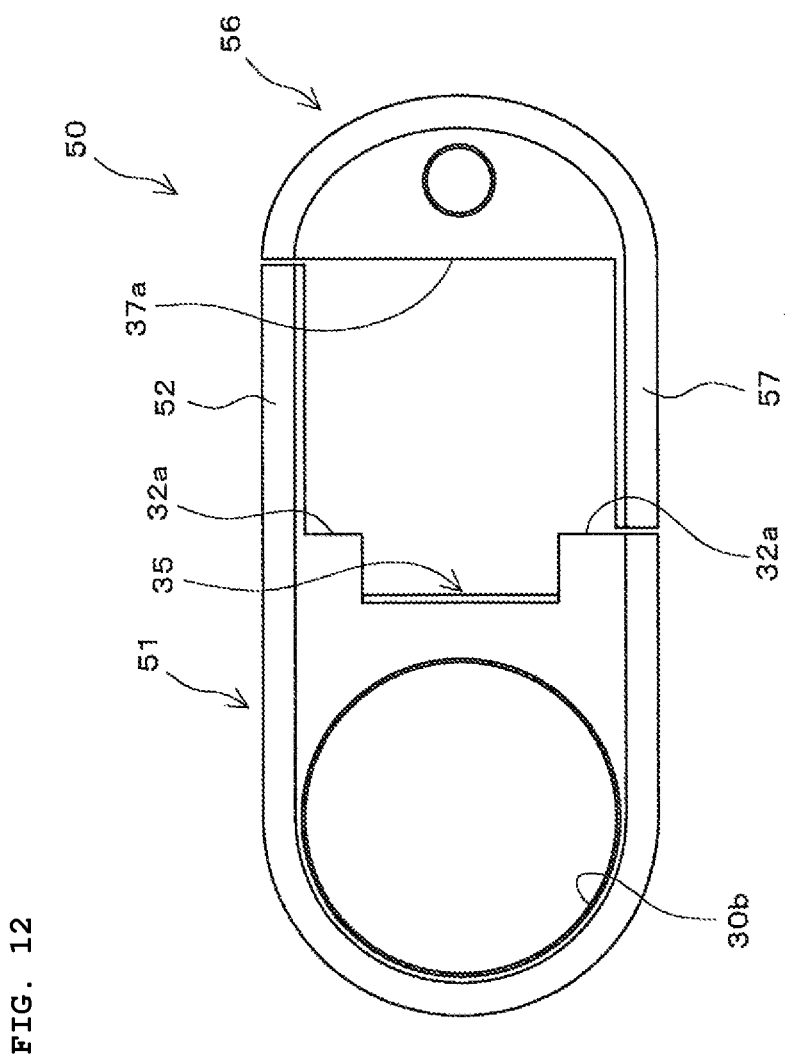
FIG. 12 is a plan view of a head portion according to a modification.
Figure 13:
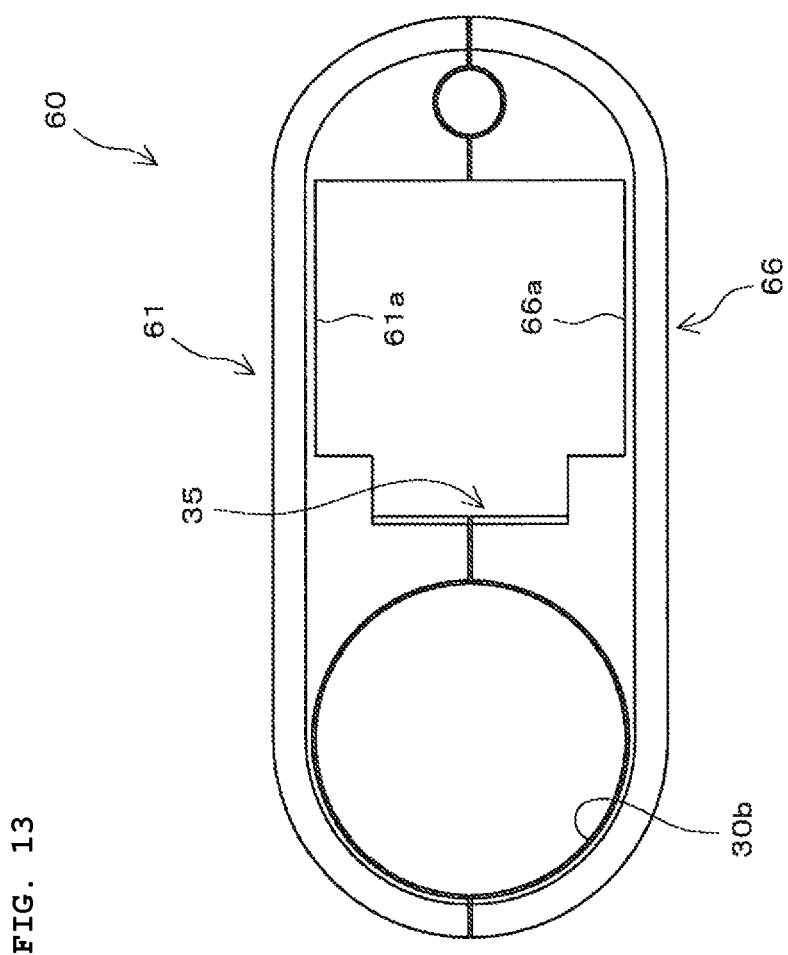
FIG. 13 is a plan view of a head portion according to a modification.

(6) FIGS. 12 and 13 are plan views of a head portion in a reaction link according to a modification. In the above embodiment, the head portion 30 is constituted by two members that can be separated so as to divide the head portion 30 by a plane perpendicular to the longitudinal direction of the head portion 30. However, the position where the head portion is divided is not limited thereto, and may be any position. For example, the head portion may be divided as shown in FIGS. 12 and 13.

A head portion 50 shown in FIG. 12 is formed by combining two members, as in the above embodiment. However, the head portion 50 is divided into two members, namely a first head member 51 and a second head member 56, such that leg portions 52 and 57 are provided respectively to the first head member 51 and the second head member 56. The head portion 50 is formed so as to have a shape similar to that of the head portion 30 in the above embodiment in a state where the two head members 51 and 56 are combined.

In the head portion 50, the above-described process in steps S3 to S5 in FIG. 10 is performed in a state where the pressing surfaces 32a and 37a of the head members 51 and 56 sandwich the linear portion 15. Thus, the head portion 50 is fixed to the linear portion 15.

A head portion 60 shown in FIG. 13 is formed by combining two members that can be separated so as to divide the head portion 60 in the width direction thereof by a plane extending in the longitudinal direction of the head portion 60. These two members, namely a first head member 61 and a second head member 66, are formed in vertically symmetric shapes. The head portion 60 is formed so as to have a shape similar to that of the head portion 30 in the above embodiment and the head portion 50 in the above modification, in a state where the two head members 61 and 66 are combined.

In the head portion 60, the above-described process in steps S3 to S5 in FIG. 10 is performed in a state where pressing surfaces 61a and 66a of the head members 61 and 66 sandwich the linear portion 15. Thus, the head portion 60 is fixed to the linear portion 15.

Figure 14:
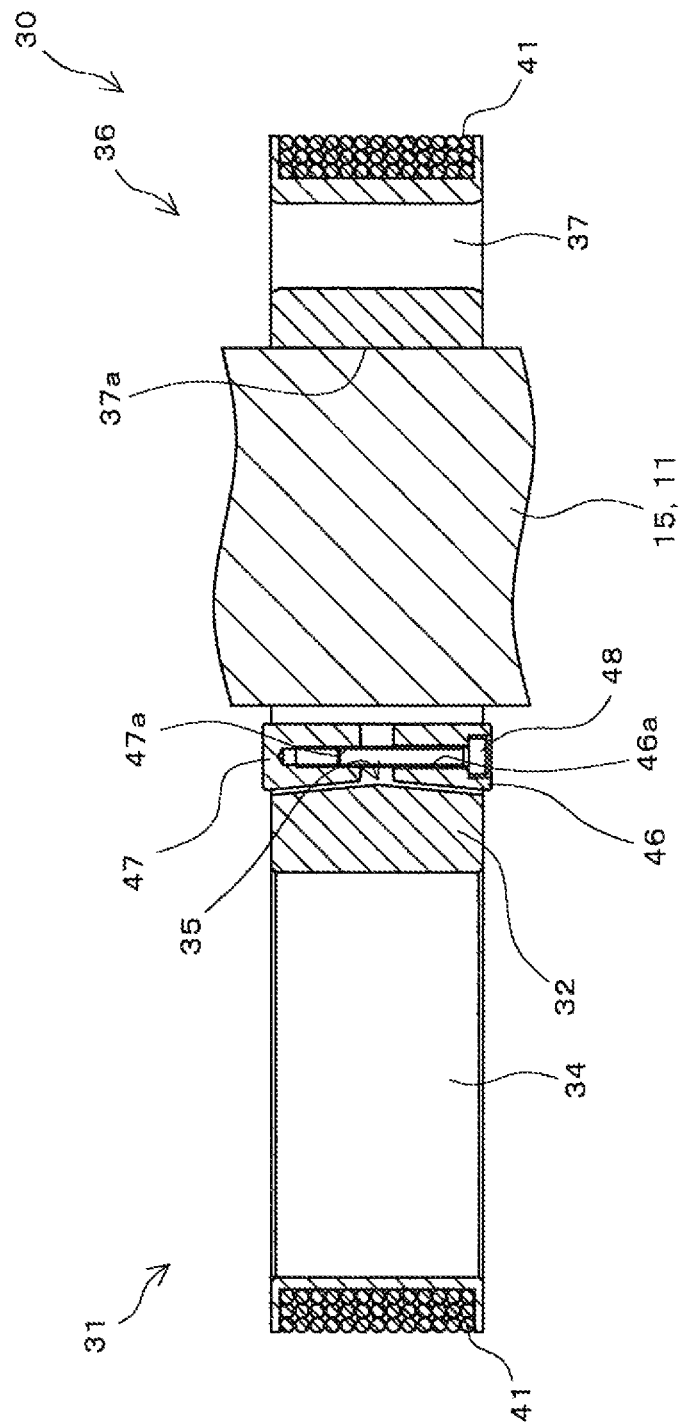
FIG. 14 is a diagram corresponding to FIG. 11, for illustrating a pair of wedge members in a reaction link according to a modification.

(7) FIG. 14 is a diagram corresponding to FIG. 11, for illustrating a pair of wedge members 46 and 47 in a reaction link according to a modification. The wedge member 46, which is one of the pair of wedge members, is the same as each wedge member 45 in the above embodiment, in terms of the outer shape thereof. However, the wedge member 46 has a through hole 46a passing through the wedge member 46 in a direction in which the wedge member 46 is inserted in the wedge recess portion 35. An internal thread is formed on the inner-circumferential surface of the through hole 46a.

The other wedge member 47 is also the same as each wedge member 45 in the above embodiment, in terms of the outer shape thereof. However, the wedge member 47 has a bottomed hole 47a extending in a direction in which the wedge member 47 is inserted in the wedge recess portion 35. An internal thread is formed on the inner-circumferential surface of the bottomed hole 47a.

In the reaction link according to the present modification, the pair of wedge members 46 and 47 in a state of being inserted in the wedge recess portion 35 are fastened to each other by a screw 48 (a connecting member). Thus, the wedge members 46 and 47 can be prevented from becoming detached from the wedge recess portion 35.

In the reaction link according to the present modification, when the wedge members 46 and 47 are inserted in the wedge recess portion 35, a space in which the wedge members 46 and 47 are inserted is expanded as a result of a portion of the head portion 30 on the first head member 31 side being biased in a direction away from the link body portion 12. In this state, the wedge members 46 and 47 are inserted, thereafter the biasing force is removed, and consequently the tensile force on the carbon fibers 41 can be increased. Accordingly, the first head member 31 and the second head member 36 can be more firmly fixed to each other.

Figure 15:
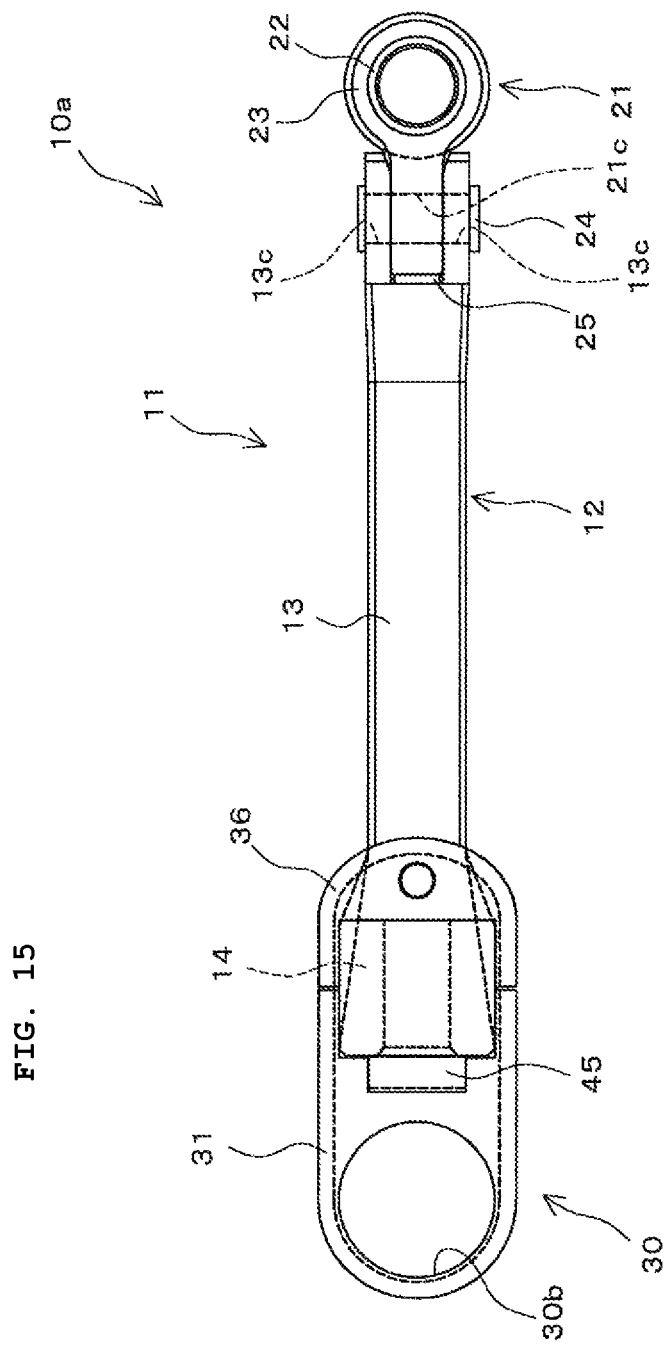
FIG. 15 is a side view corresponding to FIG. 5, of a reaction link according to a modification.

(7) FIG. 15 is a side view corresponding to FIG. 5, of a reaction link 10a according to a modification. The reaction link 10a according to the present modification further includes a leg end spacer 25.

The leg end spacer 25 is a member that is made of metal or the like, for example, and is formed substantially in a plate shape, and is in a state of being inserted in a gap between each leg portion 13 and an end of the corresponding bearing portion 21 on the leg portion 13 side, as shown in FIG. 15. The leg end spacer 25 is formed substantially in a wedge shape that is tapered from a portion thereof on the base end side in the inserting direction toward a portion thereof on the edge side.

The leg end spacer 25 is incorporated between each leg portion 13 and the corresponding bearing portion 21 that are fixed to each other, as described below. Specifically, each fastening member 24 is inserted in both a first through hole 13c formed in the leg portion 13 and a second through hole 21c formed in the bearing portion 21, and the bearing portion 21 is thereby fixed to the leg portion 13. Then the leg end spacer 25 is driven into a gap between the leg portion 13 and the bearing portion 21, with respect to the leg portion 13 and the bearing portion 21 in a state of being thus fastened to each other. Thus, a portion of the bearing portion 21 on the leg portion 13 side can be firmly sandwiched and retained between the leg end spacer 25 and the fastening member 24. Accordingly, the leg portion 13 and the bearing portion 21 can be firmly fixed, as compared with the case where the leg portion 13 and the bearing portion 21 are fastened only by the fastening member 24.

Note that it is also possible that leg end spacers 25 having different thicknesses (in an example, with a difference of 0.05 mm) are prepared and the thickness of the leg end spacer 25 to be used is determined in accordance with the gap between the link body portion 12 and the bearing portion 21 that varies due to dimensional tolerance or the like.

Figure 16:
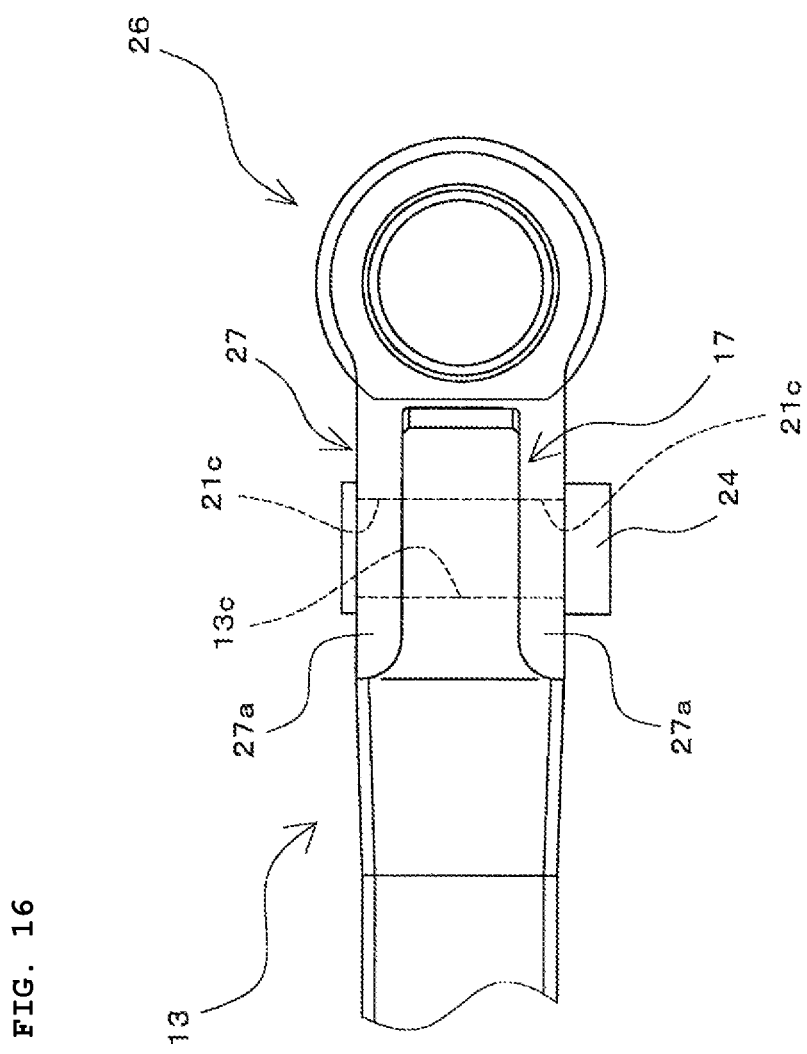
FIG. 16 is a side view of a reaction link according to a modification showing an enlargement of a bearing portion and a nearby area.

(8) FIG. 16 is a side view of a reaction link according to a modification showing an enlargement of a bearing portion 26 and therearound. As shown in FIG. 16, one projecting portion 17 projecting toward the bearing portion 26 side is formed at an end of each leg portion 13 in the present modification on the bearing portion 26 side. On the other hand, a bearing retaining portion 27 in the present modification has a pair of support portions 27a that sandwich the projecting portion 17 from both sides. In the present modification, the projecting portion 17 and the pair of support portions 27a are fastened to each other by the fastening member 24 in a state where the projecting portion 17 is sandwiched by the pair of support portions 27a. Even with this configuration, the bearing portion 26 can be fixed to the leg portion 13.

Figure 17A:
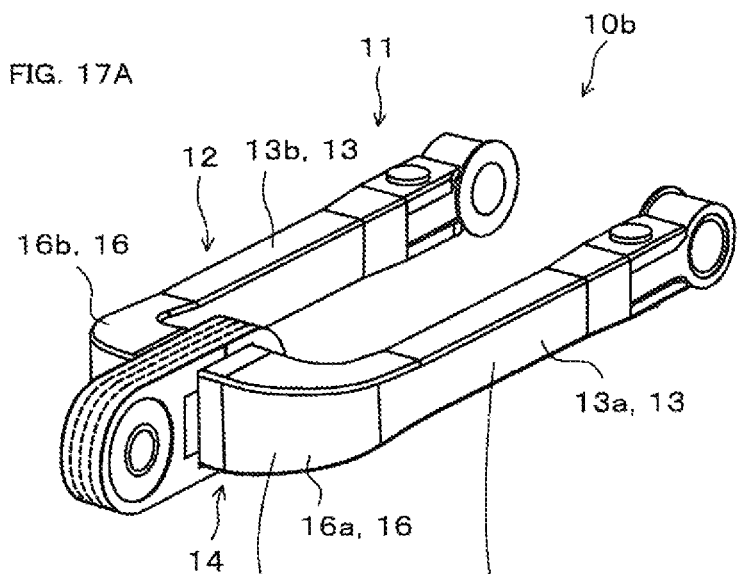
FIG. 17A is a diagram for illustrating a direction of carbon fibers contained in a reaction link according to a modification, and is a perspective view of the reaction link.
Figure 17B:
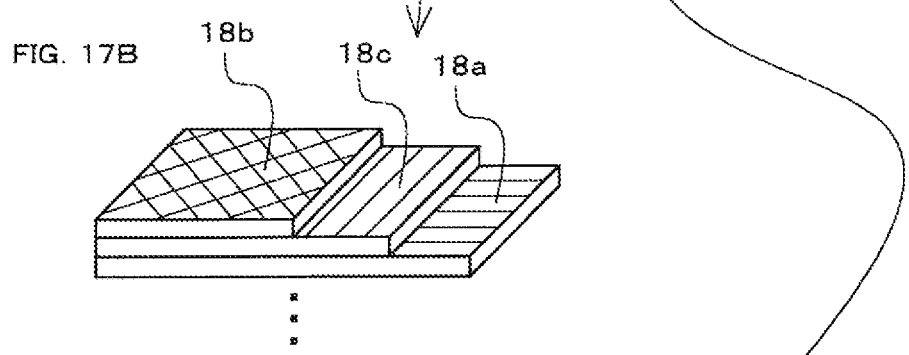
FIG. 17B is a diagram for illustrating directions of carbon fibers contained in the reaction link according to the modification, and is a perspective view schematically showing a configuration of carbon fiber reinforced plastic in bent portions of the reaction link.
Figure 17C:
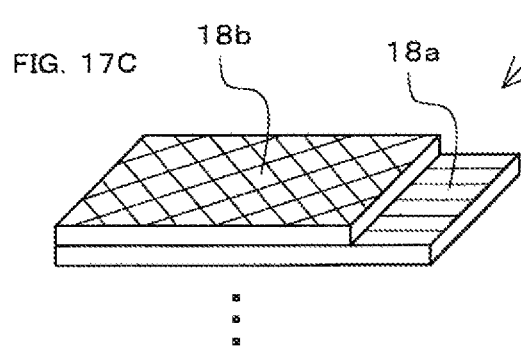
FIG. 17C is a diagram for illustrating directions of carbon fibers contained in the reaction link according to the modification, and is a perspective view schematically showing a configuration of carbon fiber reinforced plastic in leg portions of the reaction link.

(9) FIG. 17A is a diagram for illustrating a direction of carbon fibers contained in a reaction link 10b according to a modification, and is a perspective view of the reaction link 10b. FIG. 17B is a perspective view schematically showing a configuration of carbon fiber reinforced plastic in the bent portions 16 of the reaction link 10b. FIG. 17C is a perspective view schematically showing a configuration of carbon fiber reinforced plastic in the leg portions 13 in the reaction link 10b. Note that thin lines in FIGS. 17B and 17C schematically show the directions of the carbon fibers.

In the reaction link 10b according to the present modification, three materials (a first material 18a, a second material 18b, and a third material 18c) with different directions of carbon fibers are used. Specifically, the carbon fibers contained in the first material 18a are arranged so as to extend in the extending direction of the link body portion 12. The carbon fibers contained in the second material 18b are arranged so as to perpendicularly intersect with each other and intersect the direction of the carbon fibers contained in the first material 18a. The carbon fibers in the third material 18c are arranged in a direction perpendicular to the direction of the carbon fibers contained in the first material 18a.

Furthermore, in the reaction link 10b according to the present modification, the leg portions 13 are made of the first material 18a and the second material 18b, as shown in FIG. 17C. The leg portions 13 are configured by alternately stacking multiple layers of the first material 18a and the second material 18b. On the other hand, the bent portions 16 are made of the first material 18a, the second material 18b, and the third material 18c. The bent portions 16 are configured by alternately stacking multiple layers of the first material 18a, the second material 18b, and the third material 18c.

When the moving surface drive unit 1 is driven, stresses mainly in the extending direction of the leg portions 13 are generated on the leg portions 13 of the reaction link 10b. Accordingly, the reaction link 10b that is hard to break can be configured by providing, in the leg portions 13, the first material 18a in which the direction of the carbon fibers is aligned mainly with the extending direction of the leg portions 13, as in the present modification.

Also, when the moving surface drive unit 1 is driven, stresses in relatively various directions are generated on the bent portions 16 of the reaction link 10b, as compared with the stresses generated on the leg portions 13. Accordingly, the reaction link 10b that is more hard to break can be configured by using the third material 18c containing carbon fibers arranged in the direction perpendicular to the direction of the carbon fibers contained in the first material 18a, in addition to the first material 18a and the second material 18b, as in the present modification.

In the present modification, in both the leg portions 13 and the bent portions 16, the second material 18b is provided in which the directions of the carbon fibers contained therein are arranged so as to perpendicularly intersect each other and intersect the direction of the carbon fibers contained in the first material 18a. Thus, the strength and the rigidity of the entire link body portion 12 can be increased.

EXAMPLES

Figure 18:
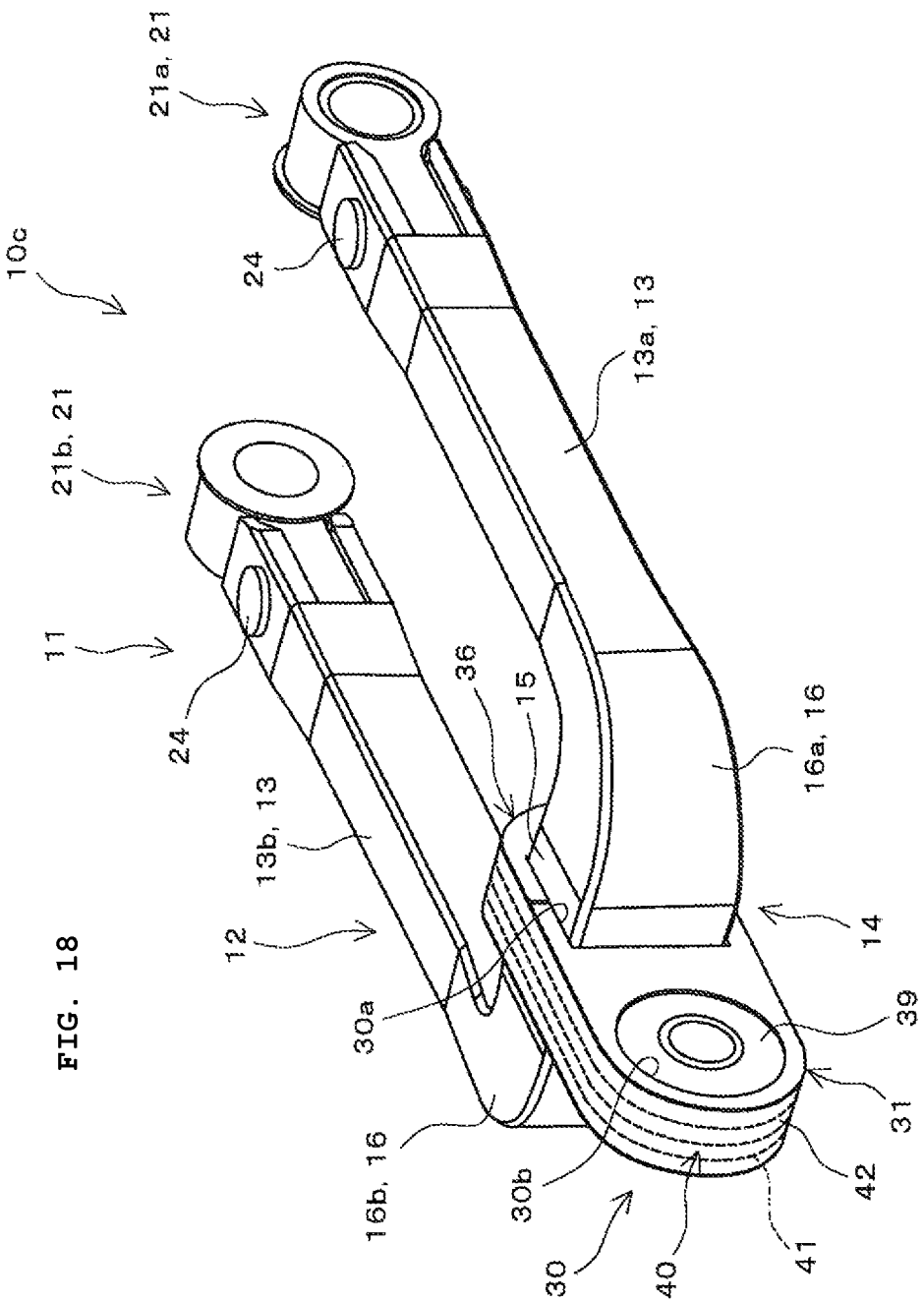
FIG. 18 is a perspective view schematically showing a configuration of a reaction link according to Example 1.

Experiments were conducted on changes of the rigidity of the reaction link in the case of adding, in order, the aforementioned various constituent elements (specifically, addition of the wedge members 46 and 47 and the screw 48, addition of the second material 18b, addition of the leg end spacer 25, etc.) to a reaction link 10c in Example 1 shown in FIG. 18. The reaction link 10c in Example 1 has a configuration in which the wedge members 46 and 47 and the screw 48, the second material 18b, and the leg end spacer 25 are omitted, as shown in FIG. 18. Furthermore, in the reaction link 10c in Example 1, each bearing portion 21 is not constituted by two members (the bearing body 22 and the bearing retaining portion 23), but is constituted by a single member in the form in which the bearing body 22 and the bearing retaining portion 23 are integrated with each other.

Figure 19:
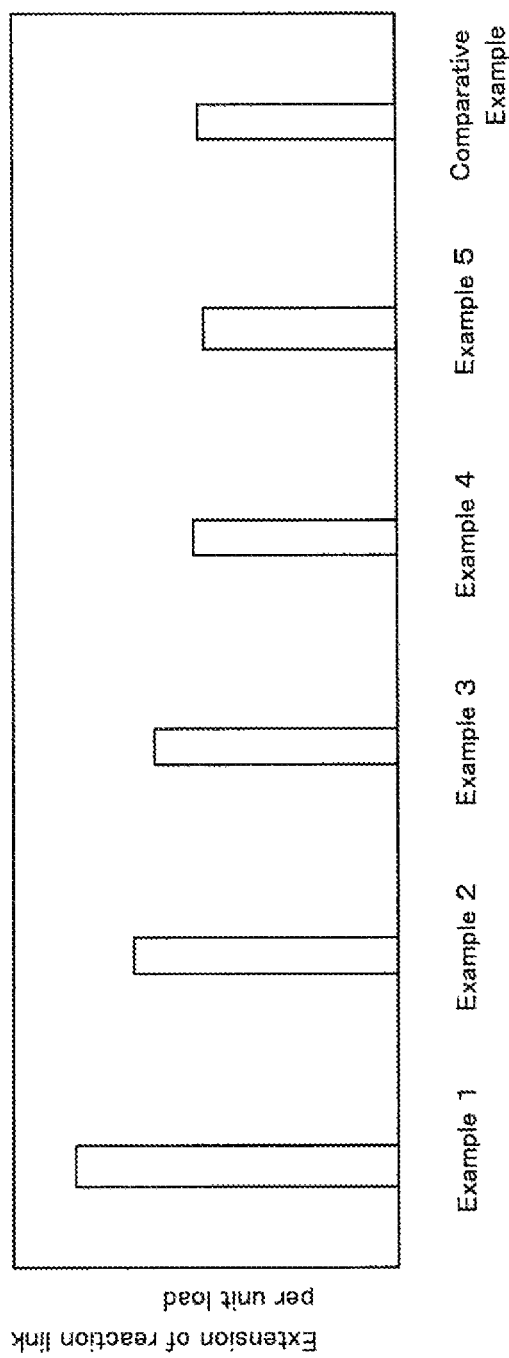
FIG. 19 is a graph showing the rigidity of reaction links according to a plurality of examples and a comparative example.

Extension of the reaction link with respect to a tensile load exerted on the reaction link was measured as the rigidity of the reaction link. FIG. 19 is a graph showing the measurement results. Note that the tensile load exerted on the reaction link was measured by pulling the pair of bearing portions 21 on the leg portion edge side and the bearing 39 on the head portion side in opposite directions in a state of holding the bearing portions 21 and the bearing 39.

A reaction link in Example 2 is an example in which the wedge members 46 and 47 and the screw 48 (see FIG. 14) were added to the reaction link 10c in Example 1. It was confirmed that the rigidity of the reaction link was improved by thus adding the wedge members 46 and 47 and the screw 48, as shown in FIG. 19.

A reaction link in Example 3 is an example in which the second material 18b (see FIG. 17) was added to the reaction link in Example 2. It was confirmed that the rigidity of the reaction link was improved by thus adding the second material 18b.

A reaction link in Example 4 is an example in which the leg end spacer 25 (see FIG. 15) was added to the reaction link in Example 3. It was confirmed that the rigidity of the reaction link was improved by thus adding the leg end spacer 25.

A reaction link in Example 5 is an example in which each bearing portion 21 in the reaction link in Example 4 is configured such that the bearing body 22 is pressed into the bearing retaining portion 23 (see FIG. 3 etc.). It was confirmed that the rigidity of the reaction link was improved due to the configuration in which the bearing body 22 is thus pressed into the bearing retaining portion 23.

In a comparative example, a reaction link having the same shape as that in the above embodiment was made of titanium, rather than carbon fiber reinforced plastic. As shown in FIG. 19, it was confirmed that the reaction link in Example 5 had a rigidity that is substantially equal to that of the titanium reaction link.

Note that although detailed descriptions and drawings are omitted, the inventors of the present application have also conducted experiments similar to the above-described experiments regarding the compression load, and has confirmed that the compression load on the reaction link in Example 5 is substantially equal to the compression load on the reaction link in the comparative example (the titanium reaction link).

The present invention can be widely applied to an aircraft reaction link connected to an actuator whose one end side is pivotably attached to a moving surface of an aircraft or to a member attached to the moving surface, and a moving surface drive unit including the aircraft reaction link. The present invention is not limited to the above embodiment, and all modifications, applications, and equivalents thereof that fall within the claims, for which modifications and applications would become naturally apparent by reading and understanding the present specification, are intended to be embraced therein.

What is claimed is:

1. An aircraft reaction link connected to an actuator whose first end side is pivotably attached to a moving surface of an aircraft or to a member attached to the moving surface, the aircraft reaction link comprising:
a link body portion that has a pair of leg portions extending linearly and arranged side by side and a connecting portion connecting one end portion of each of the leg portions to each other, the pair of leg portions and the connecting portion being made of fiber reinforced plastic and formed integrally, and the other end portion of each of the leg portions being provided pivotably with respect to a second end side of the actuator; and
a head portion that has a plurality of head constituent members fixed to the connecting portion in a state of being arranged such that the plurality of head constituent members surrounds a whole circumference of the connecting portion, at least partially in a longitudinal direction of the connecting portion and such that the connecting portion is sandwiched by the head constituent members, and that is provided pivotably with respect to the moving surface, via a bearing provided in one of the head constituent members.

2. The aircraft reaction link according to claim 1, further comprising:
a cord body that is wound around the head constituent members so as to surround the head constituent members, and thus presses the head constituent members toward the connecting portion side and fixes the head constituent members to the connecting portion.

3. The aircraft reaction link according to claim 2, further comprising:
a head fixing portion made of fiber reinforced plastic that contains reinforced fibers serving as the cord body and is provided so as to surround the head constituent members.

4. The aircraft reaction link according to claim 2,
wherein the head constituent members include a first head member and a second head member, and
the first head member and the second head member each have a pressing portion that is pressed toward the other head member such that the pressing portions of the first and second head members sandwich and retain the connecting portion.

5. The aircraft reaction link according to claim 4, further comprising:
a wedge member that is formed in a wedge shape whose thickness becomes thinner from a first end side toward a second end side, and that is driven between the connecting portion and the first head member or the second head member such that a first surface of the wedge member comes into contact with the first head member or the second head member, and such that a second surface of the wedge member that is opposite to the first surface comes into contact with the connecting portion.

6. The aircraft reaction link according to claim 5, wherein the wedge member is driven between the pressing portion and the connecting portion.

7. The aircraft reaction link according to claim 5, further comprising:
a pair of the wedge members that are driven in directions in which the wedge members approach each other, between the connecting portion and the first head member or the second head member; and
a connecting member that connects the wedge members to each other.

8. The aircraft reaction link according to claim 5,
wherein at least one of the first head member and the second head member has a wedge recess portion that forms a gap into which the wedge member is driven, between the wedge recess portion and the connecting portion, in a state where the head portion is fixed to the connecting portion.

9. The aircraft reaction link according to claim 8,
wherein the wedge recess portion has a bottom portion having a flat surface that forms the gap into which the wedge member is driven, between the flat surface and the connecting portion, and
the first surface of the wedge member or the second surface of the wedge member is in contact with the flat surface.

10. The aircraft reaction link according to claim 1,
wherein the fiber reinforced plastic contained in the leg portions includes:
a first material in which a direction of fibers contained therein is arranged so as to extend in an extending direction of the link body portion; and
a second material in which directions of fibers contained therein are arranged so as to perpendicularly intersect each other and intersect the direction of the fibers contained in the first material.

11. The aircraft reaction link according to claim 10,
wherein the connecting portion has:
a linear portion that extends in a direction intersecting the pair of leg portions; and
a pair of bent portions each connecting one of the pair of leg portions to one end portion of the linear portion and connecting the other of the pair of leg portions to the other end portion of the linear portion, and
the bent portions each have the first material, the second material, and a third material in which a direction of fibers contained therein are arranged in a direction perpendicular to the direction of the fibers contained in the first material.

12. The aircraft reaction link according to claim 1, further comprising:
a bearing portion that is provided in the other end portion of each of the pair of leg portions, and that is fixed to the other end portion by a fastening member extending in a direction perpendicular to an extending direction of the leg portions,
wherein the fastening member fixes the bearing portion to the other end portion, as a result of being inserted in both a first through hole formed in the other end portion and a second through hole formed in the bearing portion, and
the aircraft reaction link further comprises a spacer that is inserted in a gap formed in the extending direction of the leg portions between the other end portion and the bearing portion.

13. The aircraft reaction link according to claim 12,
wherein a projecting portion projecting from the other end portion of each of the pair of leg portions is formed in the other end portion, the bearing portion has a pair of support portions that sandwich and retain the projecting portion, and the fastening member is inserted in both the first through hole formed in the projecting portion and the second through hole formed in each of the pair of support portions.

14. The aircraft reaction link according to claim 12, wherein the bearing portion has:

a bearing retaining portion fixed to the other end portion of each of the pair of leg portions; and a bearing body pressed into a through hole formed in the bearing retaining portion.

15. A moving surface drive unit comprising:

an actuator whose one end side is pivotably attached to a moving surface of an aircraft or to a member attached to the moving surface; and the aircraft reaction link according claim 1 that is connected to the actuator.

* * * * *